United States Patent
Anand et al.

(10) Patent No.: US 12,211,202 B2
(45) Date of Patent: Jan. 28, 2025

(54) SELF-SUPERVISED REPRESENTATION LEARNING PARADIGM FOR MEDICAL IMAGES

(71) Applicant: GE Precision Healthcare LLC, Milwaukee, WI (US)

(72) Inventors: Deepa Anand, Bangalore (IN); Annangi V. Pavan Kumar, Bangalore (IN)

(73) Assignee: GE Precision Healthcare LLC, Waukesha, WI (US)

(*) Notice: Subject to any disclaimer, the term of this patent is extended or adjusted under 35 U.S.C. 154(b) by 768 days.

(21) Appl. No.: 17/500,366

(22) Filed: Oct. 13, 2021

(65) Prior Publication Data

US 2023/0111306 A1    Apr. 13, 2023

(51) Int. Cl.
*G06T 7/00*    (2017.01)
*G06N 3/047*    (2023.01)
(Continued)

(52) U.S. Cl.
CPC .......... *G06T 7/0012* (2013.01); *G06N 3/088* (2013.01); *G06T 7/11* (2017.01); *G06V 10/25* (2022.01);
(Continued)

(58) Field of Classification Search
None
See application file for complete search history.

(56) References Cited

U.S. PATENT DOCUMENTS

2021/0150710 A1* 5/2021 Hosseinzadeh Taher ................... G06V 10/764
2021/0279904 A1* 9/2021 Sinha ................... G06T 9/002
(Continued)

FOREIGN PATENT DOCUMENTS

CN    112802013 A  *  5/2021  .......... G06K 9/4604
CN    107133461 B  *  11/2021  .......... G06K 9/6256
(Continued)

OTHER PUBLICATIONS

Caron, M. et al. | "Emerging properties in self-supervised vision transformers." arXiv:2104.14294v2 [cs.CV] May 24, 2021, 21 pages.
(Continued)

*Primary Examiner* — Mohammed Rachedine
(74) *Attorney, Agent, or Firm* — Amin, Turocy & Watson, LLP

(57) ABSTRACT

Techniques are described for learning feature representations of medical images using a self-supervised learning paradigm and employing those feature representations for automating downstream tasks such as image retrieval, image classification and other medical image processing tasks. According to an embodiment, computer-implemented method comprises generating alternate view images for respective medical images included in set of training images using one or more image augmentation techniques or one or more image selection techniques tailored based on domain knowledge associated with the respective medical images. The method further comprises training a transformer network to learn reference feature representations for the respective medical images using their alternate view images and a self-supervised training process. The method further comprises storing the reference feature representations in an indexed data structure with information identifying the (Continued)

respective medical images that correspond to the reference feature representations.

25 Claims, 26 Drawing Sheets

(51) Int. Cl.
| | |
|---|---|
| *G06N 3/0475* | (2023.01) |
| *G06N 3/088* | (2023.01) |
| *G06N 3/0895* | (2023.01) |
| *G06N 3/096* | (2023.01) |
| *G06T 7/11* | (2017.01) |
| *G06V 10/25* | (2022.01) |
| *G06V 10/74* | (2022.01) |
| *G06V 10/762* | (2022.01) |
| *G06V 10/774* | (2022.01) |
| *G06V 10/82* | (2022.01) |

(52) U.S. Cl.
CPC ............... *G06T 2207/20081* (2013.01); *G06T 2207/20084* (2013.01); *G06T 2207/20132* (2013.01)

(56) References Cited

U.S. PATENT DOCUMENTS

| | | | |
|---|---|---|---|
| 2021/0343014 A1* | 11/2021 | Haghighi | G06V 10/25 |
| 2022/0198693 A1* | 6/2022 | Li | G06T 7/579 |
| 2022/0327691 A1* | 10/2022 | Pelissier | G16H 50/20 |
| 2023/0033783 A1* | 2/2023 | Shinagawa | G06T 1/0028 |

FOREIGN PATENT DOCUMENTS

| | | | | |
|---|---|---|---|---|
| CN | 112132778 B | * | 6/2024 | G06F 18/214 |
| WO | WO-2021111326 A1 | * | 6/2021 | G06T 7/0016 |
| WO | WO-2022011984 A1 | * | 1/2022 | G06N 3/0454 |
| WO | WO-2022194344 A1 | * | 9/2022 | |

OTHER PUBLICATIONS

Chen, T. et al.| "A Simple Framework for Contrastive Learning of Visual Representations." arXiv:2002.05709v3 [cs.LG] Jul. 1, 2020, 20 pages.

Grill, Jean-Bastien et al. | "Bootstrap your own latent: A new approach to self-supervised Learning." arXiv:2006.07733v3 [cs.LG] Sep. 10, 2020, 35 pages.

Lecun, Y et al. | "Self-supervised learning: The dark matter of intelligence", Facebook AI, webpage ttps://ai.facebook.com/blog/self-supervised-learning-the-dark-matter-of-intelligence/, published on Mar. 4, 2021, last accessed on Aug. 19, 2021, 17 pages.

* cited by examiner

Example Knee MRI Classes

Axial Tibial

Sagittal

Axial Femoral

Coronal

SELF-SUPERVISED REPRESENTATION LEARNING PARADIGM FOR MEDICAL IMAGES

TECHNICAL FIELD

This application relates to machine learning assisted medical image processing and more particularly to a self-supervised representation learning paradigm for medical images.

BACKGROUND

Machine learning models are used in many medical image processing and analysis tasks like organ segmentation, anomaly detection, diagnosis classification, risk prediction, temporal analysis, image reconstruction, and so on. One of the fundamental problems in data-driven based machine learning approaches is that the final model inferencing capability is limited by the scope of the training data used to develop the model. ML algorithms have generally been categorized into two broad classes, supervised and unsupervised. In a supervised paradigm, the learning system is first given examples of data by which human experts or annotators apply classification labels to a corpus of data. The class labels are then used by the learning algorithm to adapt and change it's internal, mathematical representation (such as the behavior of artificial neural networks) of the data and mapping to some predication of classification etc. The training consists of iterative methods using numerical, optimization techniques that reduce the error between the desired class label and the algorithm's prediction. The newly trained model is then given new data as an input and, if trained well, can classify or otherwise provide assessment of novel data.

Because the supervised training paradigm is dependent upon rich and varied data, it is imperative that training data be accurate and represent most of the variants the algorithm could 'see' when new data is presented to it. For example, consider development of a diagnostic model configured to evaluate chest x-rays to classify them as normal versus abnormal. There could be hundreds of different variables that would make an x-ray abnormal. Thus, to train the diagnostic model, a corpus of data would be needed that shows all the possible representations of all those different variables compared to representations that would be classified as normal. That could add up to thousands or even millions of images, all of which would need to be labeled and annotated in a consistent manner.

Currently techniques for generating annotated training data for machine learning in healthcare informatics are inefficient, burdensome and prone to error. For example, to create the training data needed to generate accurate medical imaging diagnostic models, human experts must label the images with information identifying/classifying the relevant semantic content of the images for a specific inferencing task. Thus, to create sufficient training data for medical imaging-based diagnostics, human annotators must evaluate image data sets to classify their semantic content and/or detect and interpret a large variety of pathophysiology and artifacts in medical imagery and further accurately and consistently label the artifacts. The collection of data sets in a retrospective training setting by which a human expert sorts through and highlights and classifies findings on pre-selected exams can be extremely tedious, expensive and time-consuming. In addition, because it involves fallible and opinionated human experts defining what the algorithm will be looking for, it's also an opportunity for unconscious bias to creep in. Annotation is thus a considerable part of the challenge of creating machine learning algorithms in the healthcare field.

In an unsupervised learning regime, the machine learning algorithm learns from unlabeled data, usually to automatically group or segment the data, or to detect anomalies. Although, unsupervised learning techniques are not restricted by the need for labeled training, the maturity and robustness of these methods to date do not warrant themselves yet to the rigor needed for routine clinical practice.

Self-supervised learning (SSL) is a newer method of machine-learning that can be regarded as an intermediate form of supervised and unsupervised learning. SSL is a type of autonomous learning using artificial neural networks that no not require labeled training data. The motivation behind SSL is to learn useful representations of the data from an unlabeled pool of data using self-supervision first and then fine-tune the representations with few labels for a supervised downstream task. The downstream task could be as simple as image classification or a complex task such as semantic segmentation, object detection, etc. Self-supervised learning obtains supervisory signals from the data itself, often leveraging the underlying structure in the data. The general technique of SSL is to predict any unobserved or hidden part (or property) of the input from any observed or unhidden part of the input. For example, as is common in natural language processing (NLP), we can hide part of a sentence and predict the hidden words from the remaining words. We can also predict past or future frames in a video (hidden data) from current ones (observed data). Since SSL learning uses the structure of the data itself, it can make use of a variety of supervisory signals across co-occurring modalities (e.g., video and audio) and across large data sets without relying on labels.

SSL has had a particularly profound impact on NLP, allowing us to train models on large unlabeled text data sets and then use these models for downstream tasks. These models are pretrained in a self-supervised phase and then fine-tuned for a particular task, such as classifying the topic of a text. For example, as applied to NLP, in the self-supervised pretraining phase, the system is shown a short text (typically 1,000 words) in which some of the words have been masked or replaced. The system is trained to predict the words that were masked or replaced. In doing so, the system learns to represent the meaning of the text so that it can do a good job at filling in "correct" words, or those that make sense in the context.

SSL techniques however haven't been easily extended to new domains including image processing. Despite promising early results, SSL has not yet brought about the same improvements in computer vision that we have seen in NLP. One of the main reasons is that is considerably more difficult to represent uncertainty in the prediction for images than for words. This problem is even more difficult for medical images due to their visual complexity and variation owing to different acquisition protocols, patient anatomies and patient pathologies.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments herein, systems, computer-implemented methods, apparatus and/or computer program products are described that provide a self-supervised representation learning paradigm for medical images.

According to an embodiment, a system is provided that comprises a memory that stores computer executable components, and a processor that executes the computer executable components stored in the memory. The computer executable components comprise a paired view generation component that generates alternate view images for respective medical images included in set of training images using one or more image augmentation techniques or one or more image selection techniques tailored based on domain knowledge associated with the respective medical images. The computer executable components further comprise a training component trains a transformer network to learn reference feature representations for the respective medical images using their alternate view images and a self-supervised training process, and an indexing component that stores the reference feature representations in an indexed data structure with information identifying the respective medical images that correspond to the reference feature representations.

In some embodiments, the alternate view images comprise augmented versions of the respective medical images generated using the one or more image augmentation techniques, wherein the one or more image augmentation techniques comprise altering an appearance of the respective medical images in a defined manner based on the domain knowledge in association with generating the alternate view images as synthetic versions of the respective medical images. In some implementations, the altering comprises changing one or more acquisition parameters of the respective medical images in association with generating the alternate view images. Additionally, or alternatively, the altering can comprise cropping the respective medical images based on regions of interest identified for the respective medical images in association with generating the alternate view images. In some implementations of these embodiments, the transformer network comprises a vision transformer network comprising attention heads, and the computer executable components further comprise a region of interest component that identifies the regions of interest based on attention head maps derived from the attention heads in association with applying the vision transformer network to the respective medical images. With these embodiments, the paired image component can further iteratively generate new alternate view images for the respective medical images based on the attention head maps, and the training component can iteratively retrain the transformer network to learn the reference feature representations for the respective medical images using their new alternate view images and the self-supervised training process.

In other embodiments, the alternate view images can comprise similar versions of the respective medical images selected from an image dataset using the one or more image selection techniques, wherein the one or more image selection techniques comprise selecting the similar versions based on defined similarity criteria for attributes of the respective medical images and their similar versions. For example, the attributes may be included in metadata associated with the respective medical images and their similar versions. The attributes can include defined attributes determined to be relevant to the particular domain associated with the medical images (e.g., the capture modality, the anatomical region or regions depicted, the type of the medical images, the acquisition protocol, the patient group, etc.). In this regard, the attributes can include but are not limited to, acquisition parameter attributes, patient attributes, visual property attributes, and three-dimensional (3D) scan position attributes.

In one or more embodiments, the computer executable components can further comprise a feature generator component that applies the transformer network to a new medical image to generate a feature representation for the new medical image. The computer executable components can further comprise a matching component that employs the feature representation and the reference feature representations to identify one or more similar medical images of the respective medical images whose reference feature representations have a defined degree of similarity to the feature representation. With these embodiments, the computer executable components may further comprise a retrieval component that retrieves the one or more similar medical images from a datastore where they are stored in response to identification of the one or more similar medical images. For example, the similar images can be used to supplement a training data set with additional similar images that are similar to a given representative image (i.e., the new medical image). The similar images can also be retrieved in the context of provision to a clinician in association with performing comparative case studies, longitudinal analysis studies and the like.

Additionally, or alternatively, the indexing component can further associate classification information with the reference feature representations in the indexed data structure, the classification information identifying one or more defined class attributes of the respective medical images corresponding to the reference feature representations. For example, the class attributes can identify a type of the medical image, an anatomical region depicted in the medical image, an orientation of the medical image, a contrast phase depicted in the medical image, a disease classification for the medial image, and so on. The computer executable components can further comprise a classification component that determines a classification of the new medical image based on the one or more defined class attributes associated with the one or more similar medical images.

Still in other embodiments, the computer executable components can further comprise a clustering component that clusters the feature representations into distinct clusters based on similarities between respective feature representations included in the distinct clusters. The computer executable components can further comprise an annotation component that selects one or more representative medical images for each of the distinct clusters for annotation with classification information based on relative positions of their feature representations within or around the distinct clusters. In some implementations of these embodiments, based on selection, the annotation component can facilitate receiving the classification information for the one or more representative medical images (e.g., in association with providing to an expert for manual annotation) resulting in annotated medical images. The training component can further train one or more classification models to classify non-annotated medical images based on their feature representations using the annotated representative medical images and their corresponding feature representations.

The computer executable components can further comprise a feature generator component that applies the transformer network to a new medical image to generate a feature representation for the new medical image, and a classification component that applies the one or more classification models to the feature representation to determine a classification of the new medical image.

In some embodiments, elements described in the disclosed systems and methods can be embodied in different forms such as a computer-implemented method, a computer program product, or another form.

DETAILED DESCRIPTION

Figure 1:
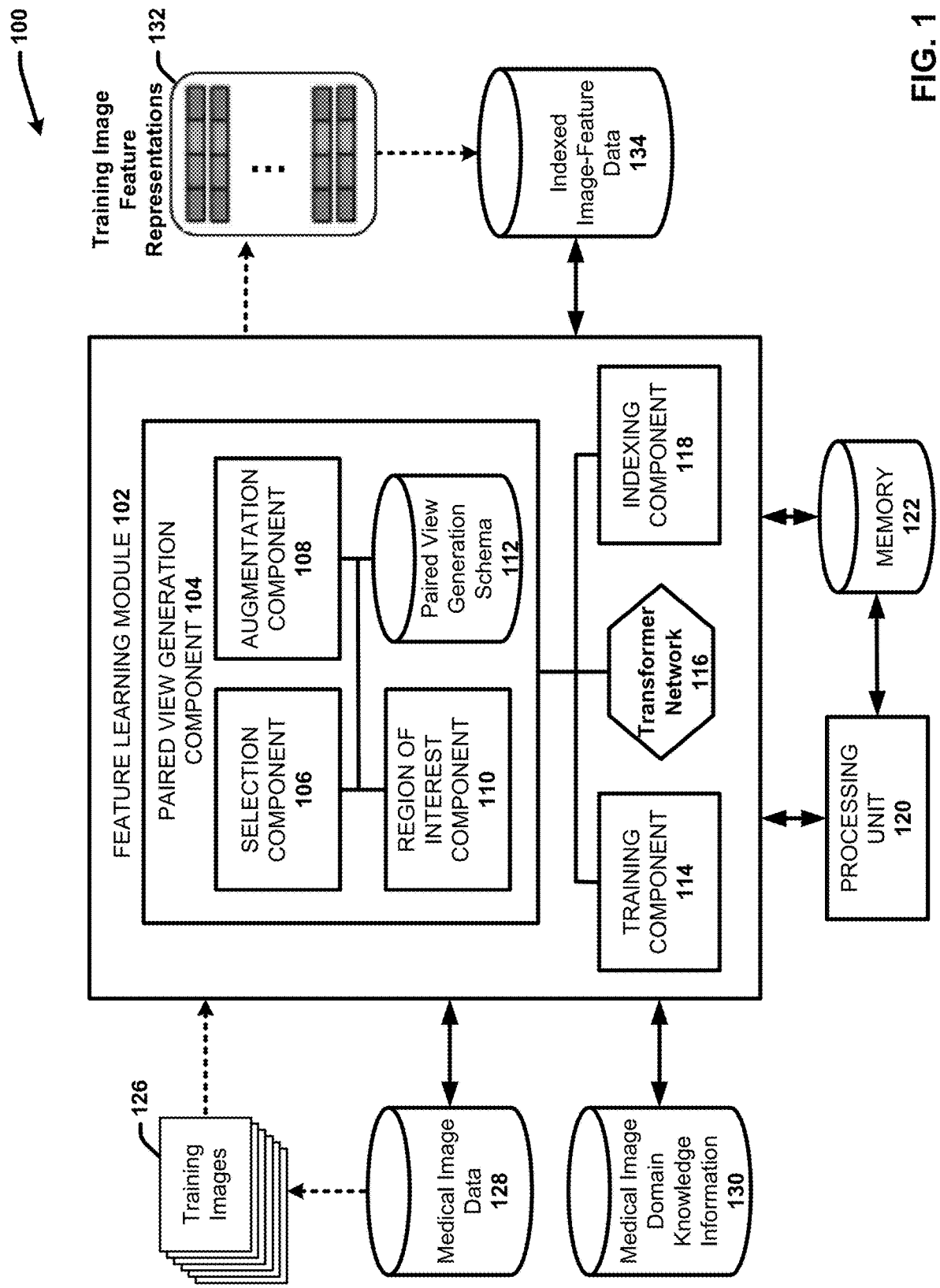
FIG. 1 illustrates an example system for learning feature representations of medical images using a self-supervised learning paradigm in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that provide a self-supervised representation learning paradigm for medical images. In one or more embodiments, the disclosed techniques employ a self-supervised learning process to train a transformer network to automatically learn representations of medical images included in training set using paired similar image versions for each of the medical images. These paired alternate image versions are feed into parallel arms of a distillation model, wherein respective arms of the distillation model include teacher and student instances of the same transformer network. The result of this self-supervised learning process includes feature representations for each of the training images, as well as a trained transformer network capable of accurately generating new feature representations for new medical images included in training image domain/feature space. These training image feature representations can be stored and used for automating other tasks, including similar image retrieval, image classification, and other medical image processing tasks.

The disclosed techniques further provide novel mechanism to automatically generate or select the paired similar image versions (e.g., without manual involvement) for training the transformer network in a manner that is tailored based on domain knowledge associated with the medical images. In this regard, rather than generating an alternate version of a training medical image by randomly cropping, rotating, adjusting the resolution, etc., the disclosed techniques learn and define image augmentation schema that controls the alternate image generation/selection process in a manner that is specific to medical images, and/or specific to the types of the medical images, the anatomical region/regions depicted, the acquisition parameters/protocols used, the patient demography, the patient pathology, and clinical and non-clinical features associated with the medical images. In some embodiments, the disclosed methods further iteratively refine the medical image augmentation strategies based on the learned training image representations over the training epochs.

The terms "algorithm" and "model" are used herein interchangeably unless context warrants particular distinction amongst the terms. The term "clinical inferencing model" is used herein to refer to a AI/ML model configured to perform a clinical decision/processing on clinical data. The clinical decision/processing task can vary. For example, the clinical decision/processing tasks can include classification tasks (e.g., disease classification/diagnosis), disease progression/quantification tasks, organ segmentation tasks, anomaly detection tasks, image reconstruction tasks, and so on. The clinical inferencing models can employ various types of ML algorithms, including (but not limited to): deep learning models, neural network models, deep neural network models (DNNs), convolutional neural network models (CNNs), generative adversarial neural network models (GANs), long short-term memory models (LSTMs), attention-based models, transformers and the like.

As used herein, a "medical imaging inferencing model" refers to an image inferencing model that is tailored to perform an image processing/analysis task on one or more medical images. For example, the medical imaging processing/analysis task can include (but is not limited to): image reconstruction, image enhancement, scan series characteristic classification, disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an enhanced image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The terms "image-based inference output", "inference output" "inference outcome," "inference result" "inference", "output", "outcome," "predication", and the like, are used herein interchangeably unless context warrants particular distinction amongst the terms. The outputs can be in different formats, such as for example: a Digital Imaging and Communications in Medicine (DICOM) structured report (SR), a DICOM secondary capture, a DICOM parametric map, an image, text, and/or JavaScript Object Notation (JSON).

The types of medical images processed/analyzed by the disclosed transformer networks, feature matching algorithms, classification models, and other medical image inferencing models described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can also include synthetic versions of native medical images such as augmented, modified or enhanced versions of native medical images, augmented versions of native medical images, and the like generated using one or more image processing techniques. In this regard, the term "native" image is used herein to refer to an image in its original capture form and/or its received form prior to processing by the disclosed systems. The term "synthetic" image is used herein to distinguish from native images and refers to an image generated or derived from a native image using one or more image augmentation processing techniques (e.g., cropping, rotating, and/or otherwise adjusting the visual appearance of the image). The medical imaging processing models disclosed herein can also be configured to process 3D images.

A "capture modality" as used herein refers to the specific technical mode in which an image or image data is captured using one or more machines or devices. In this regard, as applied to medical imaging, different capture modalities can include but are not limited to: a 2D capture modality, a 3D capture modality, an RT capture modality, a XR capture modality, a DX capture modality, a XA capture modality, a PX capture modality a CT, a MG capture modality, a MRI capture modality, a US capture modality, a CD capture modality, a PET capture modality, a SPECT capture modality, a NM capture modality, and the like.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 presents an example system 100 that facilitates learning feature representations of medical images using a self-supervised learning paradigm in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

In this regard, system 100 includes a feature learning module 102 that corresponds to and includes several computer executable components. These computer executable components include paired view generation component 104, selection component 106, augmentation component 108, region of interest component 110, training component 114, transformer network 116 and indexing component 118. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 122 which can be coupled to processing unit 120 for execution thereof. Examples of said and memory and processor/processing unit as well as other suitable computer or computing-based elements, can be found with reference to FIG. 26, and can be used in connection with implementing one or more of the systems or components shown and described in connection with FIG. 1 or other figures disclosed herein.

System 100 further includes various data structures (e.g., data stores, databases, data files, and the like) that provide information used by the feature learning module 102 and/or aggregate information generated by the feature learning module 102. This information includes medical image data 128, medical image domain knowledge information 130, paired view generation schema 112 and indexed image-feature data 134. The type of data structures and/or data sources in which this information is stored and located can vary. The feature learning module 102 can be operatively and communicatively coupled to these data structures either directly or via one or more wired or wireless communication networks (e.g., the Internet, an Intranet, etc.).

The deployment architecture of system 100 (and other systems described herein) can vary. In some embodiments, the feature learning module 102 can be deployed at and executed by a single computing device (e.g., real or virtual) operatively coupled to the processing unit 120 and the memory 122. With these embodiments, one or more of the various data structures including the medical image data 128, the medical image domain knowledge information 130, the paired view generation schema 112 and the indexed image-feature data 134 may also be stored locally on the same computing device and/or remotely at another device and accessed by the computing device via a wired or wireless communication network. In other embodiments, one or more components of the feature learning models 104 can be deployed at two or more separate communicatively coupled computing devices operating in a distributed computing environment. The separate computing devices can be communicatively coupled via one or more wired or wireless communication networks. With these embodiments, one or more of the various data structures including the medical image data 128, the medical image domain knowledge information 130, the paired view generation schema 112 and the indexed image-feature data 134 may also be stored locally on the same computing device and/or remotely at another device and accessed by the components of the feature learning module 102 via a wired or wireless communication network. Various alternative deployment architecture variations can also be used.

The feature learning module 102 provides tools for automatically learning feature representations for a set of medical images using a self-supervised machine learning process. In the embodiment shown, this set of medical images is represented as training images 126 that are provided in the medical image data 128. In this regard, the medical image data 128 may include one or more data stores or databases that include a repository of medical images. The type or types of medical images included in the training images 126 dataset can vary. For example, the medical images in the set can include images depicting same or different anatomical regions and patients, captured using same or different imaging modalities (e.g., XR, PT, MRI, CT, etc.), and/or captured using same or different acquisition parameters/protocols. The source of the medical images can also vary. For instance, a data store comprising the medical image data 128 can include or correspond to a local or remote medical image data store, such as for example, internal databases, third party databases, workstations, Picture Archiving and Communication Systems (PACS) and consoles, and so forth. The set of medical images can also be extracted from a plurality of different data sources and/or medical image provider systems (e.g., hospital systems, imaging systems, and so on). In this regard, the medical image data 128 can be centrally represented while providing the ability to move across the organization between various types of endpoints and storages that can be implemented in a seamless manner.

The medical images included in the medical image data 128 may also include or be associated with a variety of rich metadata (e.g., in the form of metadata tags of the like) describing known attributes associated with the respective images. The specific metadata that may or may not be associated with the images can vary. For example, the metadata may also include information identifying or indicating the type of imaging study that was performed (e.g., modality, anatomical region or regions scanned), the image series to which each image belongs, the timing of the study, the location of the study and so on. The acquisition parameters/protocol information can vary depending on the modality of the imaging study performed. Some example acquisition parameters/protocol information may include (but is not limited to): contrast phase, imaging frequency, reconstruction kernel size, slice thickness, radiation dose, view of an XR image, MR sequence, capture resolution, voxel size, scan prescription plane, scan region, bounding box, and scan time. The metadata may also include information describing known visual properties of the medical images such as image quality, image resolution, signal noise, pixel spacing, imaging depth, image capture position/orientation (e.g., including the relative scan position to other scan images generated for a medical image series), relative position/dimension of anatomical landmarks, and so on. The metadata may also include information describing known attributes of the patient/subject represented in the medical image (e.g., patient identifiers, patient demographic information, body mass index (BMI), medical history, pathology, etc.). The medical image data 128 can further structure the metadata into a standardized format (e.g., a Digital Imaging and Communications in Medicine (DICOM) standard format) to facilitate searchable results.

The feature representations learned/generated for the training images 126 by the feature learning module 102 are represented in system 100 as training image feature representations 132. These feature representations can correspond to feature vectors or digital fingerprints for each of the training images that provide a reduced dimensionality representation of the most important image pixel features included in each of the images. Each feature representation thus uniquely captures the semantic content of the respective training images. These training image feature representations 132 can be stored in suitable indexed data structure along with their corresponding training images 126 and/or information identifying their corresponding training images (e.g., an image identifier and/or file source) and used to facilitate downstream tasks such as image retrieval, image classification and other tasks, as described in greater detail with reference to FIGS. 9-25).

As noted above, the feature learning module 102 can automatically learn and generate the training image feature representations 132 with no or minimal manual involvement using a self-supervised representation learning process performed by the training component 114. This self-supervised representation learning process involves training a transformer network 116 to learn the feature representation for each training image included in the set of training images 126 using one or more alternate versions of the training images to drive the learning. One piece of particular importance that drives the automation and accuracy of this this self-supervised training process as applied to medical images is the ability of the automatically generate these alternate image versions in a meaningful way that ensures the relevant semantic content of the native training image is represented in the one or more alternate image versions. As described in greater detail below, to facilitate this end, the paired view generation component 104 can employ one or more image augmentation techniques and/or one or more image selection techniques tailored based on domain knowledge (e.g., provided by the medical image domain knowledge information 130) associated with the respective medical images to generate these meaningful alternate images.

The transformer network 116 comprises a deep learning neural network model architecture generally referred to as a transformer, that has been adapted for generating image feature representations. In this regard, the transformer network 116 can include or correspond to a vision transformer. Transformers have recently emerged as an alternative to convolutional neural networks (CNNs or convnets) for visual recognition. Their adoption has been coupled with a training strategy inspired by natural language processing (NLP), that is, pretraining on large quantities of data and finetuning on the target dataset. The transformer network 116 adopts the mechanism of attention, differentially weighing the significance of each part of the input data. Like recurrent neural networks (RNNs), transformers are designed to handle sequential input data, such as natural language, for tasks such as translation and text summarization. However, unlike RNNs, transformers do not necessarily process the data in order. Rather, the attention mechanism provides the context for any position in the input sequence.

The transformer network 116 adopts an encoder-decoder architecture. The encoder consists of encoding layers that process the input iteratively one layer after another, while the decoder consists of decoding layers that do the same thing to the encoder's output. The function of each encoder layer is to generate encodings that contain information about which parts of the inputs are relevant to each other. It passes its encodings to the next encoder layer as inputs. Each decoder layer does the opposite, taking all the encodings and using their incorporated contextual information to generate an output sequence. To achieve this, each encoder and decoder layer makes use of an attention mechanism. For each input, attention weighs the relevance of every other input and draws from them to produce the output. Each decoder layer has an additional attention mechanism that draws information from the outputs of previous decoders, before the decoder layer draws information from the encodings. Both the encoder and decoder layers have a feed-forward neural network for additional processing of the outputs and contains residual connections and layer normalization steps.

Figure 2:
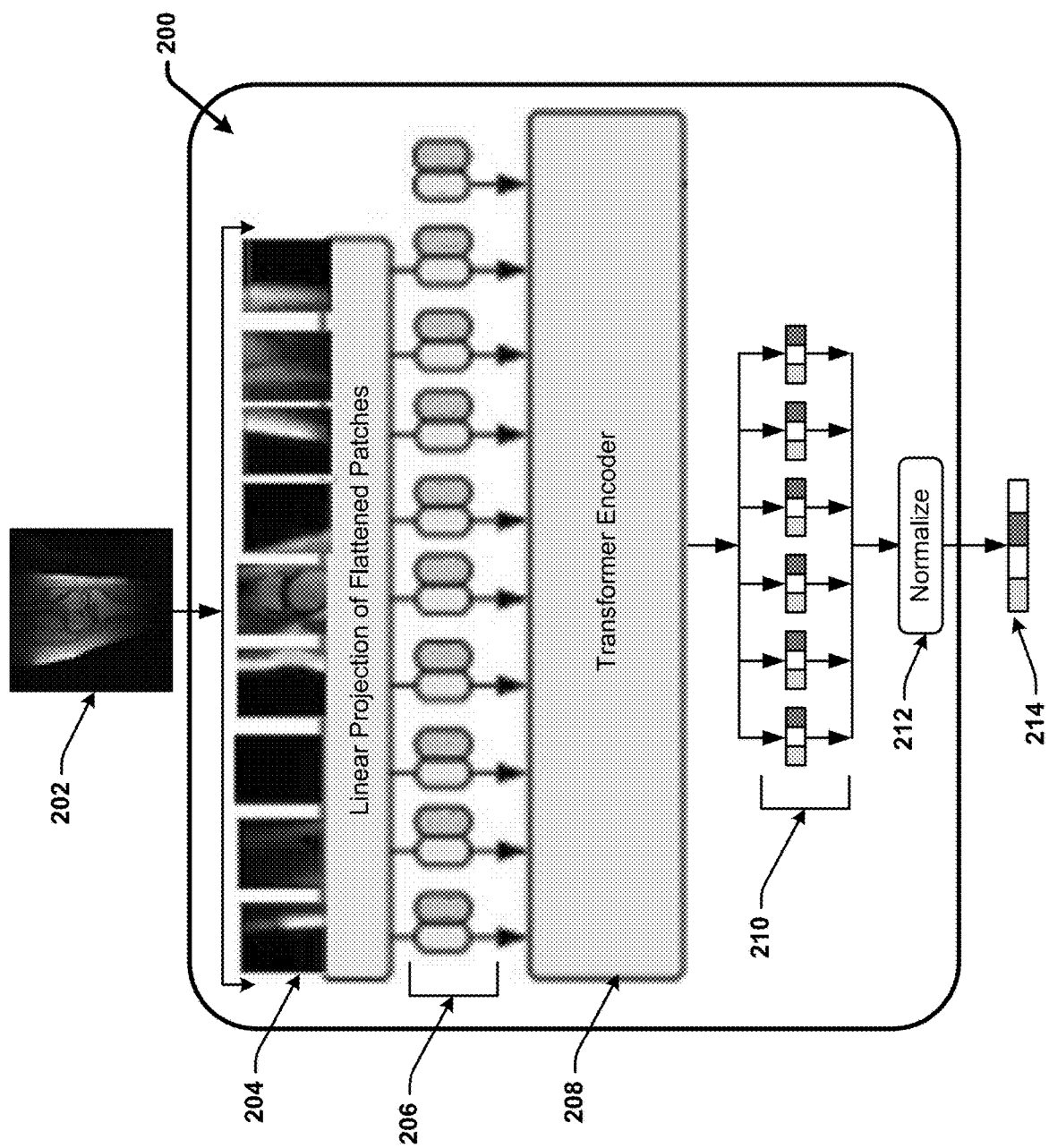
FIG. 2 presents an example vision transformer network in accordance with one or more embodiments of the disclosed subject matter.

FIG. 2 presents an example vision transformer (ViT) network 200 that can be used as the transformer network 116 to generate feature representations for medical images. The ViT network 200 takes an input image 202 and image is cut into several different patches 204. These patches are linear projections that contain different portions of the input image 202. The patches and the relative positions of the patches are fed into the transformer encoder 208 which learns patch feature representations 210 for each of the patches as well as an intermediate a representation for the entire input image. To facilitate this end, the ViT employs a plurality of different attention heads 206 that respectively identify the regions in the respective patches that contain the most important/influential features to be fed into the transformer encoder 208. In this regard, the attention heads 206 employ a mechanism to identify the regions in the patches 204 that are most influential in getting the relevant features to generate the patch feature representations 210. These patch features representations and the intermediate representation for the entire image are then normalized by a normalization layer 212 to generate a final feature representation 214 for the input image 202. The final feature representation 214 is thus a concatenation of the features extracted by each of the attention heads 206. This final feature representation 214 can be stored and can be used for different tasks, such as image retrieval, image classification, and other tasks.

Figure 3:
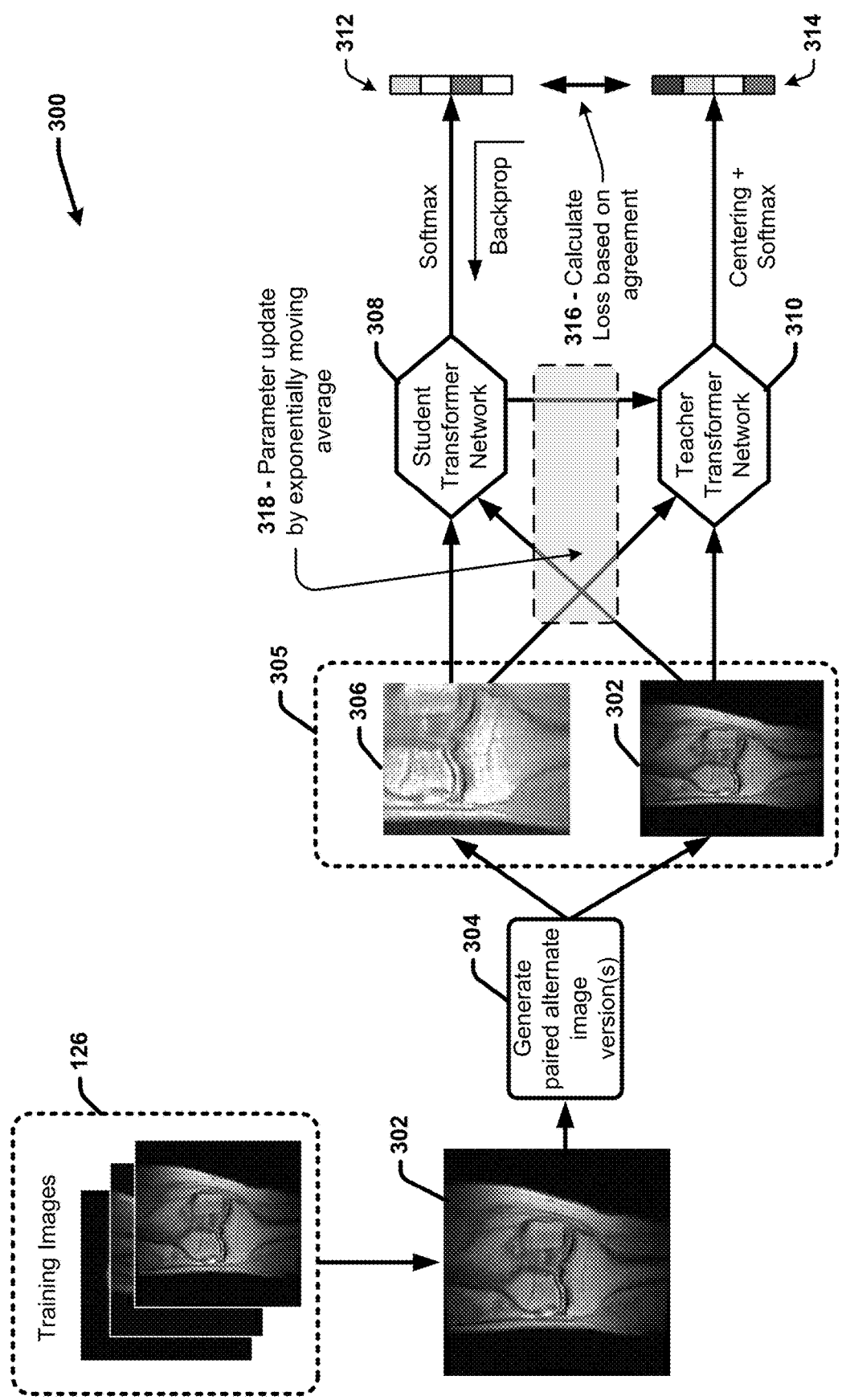
FIG. 3 illustrates an example self-supervised representation learning paradigm for medical images using parallel transformer networks in accordance with one or more embodiments of the disclosed subject matter.

FIG. 3 illustrates an example self-supervised representation learning process 300 for medical images using parallel transformer networks in accordance with one or more embodiments of the disclosed subject matter. With reference to FIGS. 1 and 3, process 300 provides an example self-supervised training process that can be performed by the training component 14 and the paired view generation component 104 to learn and generate the training image feature representations 132. In accordance with processes 300, the training component 114 trains the transformer network 116 to generate the feature representations for each of the training images 126 by creating two instances of the transformer network 116, one referred to as the student transformer network 308 and another referred to as the teacher transformer network 310. The student transformer network 308 and the teacher transformer network 310 employ identical network architectures. In various embodiments, both the student and the teacher transformer networks correspond to the ViT network 200 illustrated in FIG. 2.

In accordance with the self-supervised training process 300, the training component 114 trains the network with the objective of presenting two different views of the same input image 302 image with the assumption that they should have similar feature representations. To facilitate this end, at 304, the paired view generation component 104 generates paired alternate image versions 305 of the input image 302. As described in greater detail below, the alternate image or images for the input image 302 can include augmented versions of the input image 302 generated by adapting the appearance of the input image using one or more defined augmentation mechanisms tailored based on domain knowledge associated with the input image. These augmentation mechanisms can include for example, cropping, changing visual properties (e.g., resolution, brightness, etc.), changing the orientation of the input image, and so on, to create a synthetic version of the input image 302. Additionally, or alternatively, these augmentation mechanisms can include selecting a separate native medical image from the medical image data 128 that is similar to the input image 302 using metadata associated with the respective images. For example, in implementations in which the input image includes a scan image included in a series (e.g., a CT scan series, an MRI scan series, etc.), the separate image may include another image in the same scan series that neighbors the input image 302 (e.g., captured at a different point along the same acquisition axis in the z-direction or another direction).

In this example, the paired alternate image versions 305 include one alternate image version 306 which is paired with the input image 302 in its original form. In other implementation, both of the paired alternate image versions 305 can include different versions of the input image 302. Each of the paired images 302 and 306 are then respectively fed into the student transformer network 308 and the teacher transformer network 310, wherein the respective networks generate feature representations for each of the images in parallel (e.g., parallel arms of a distillation model). In this example, feature representation 312 corresponds to a feature representation generated by the student transformer network 308 for the alternat image 302, and feature representation 314 corresponds to a feature representation generated by the teacher transformer network 310 for the input image 302. The self-supervised aspect of this training process is based on comparing the feature representation outputs of the student and teacher networks, calculating loss based on agreement at 316, and iteratively updating the parameters of both the student and teacher networks at 318 until the feature representations generated by each of the student and teacher for the different image versions converge on the same feature representation (e.g., to a defined degree of similarity). The loss function used at 316 can vary. In some implementations, the loss can be based on distillation loss. In other implementations, the loss can be based on contrastive loss. The parameter updating at 318 can involve updating the parameters of both models by exotically moving the average of both the student and teacher model parameters.

The final converged feature representation generated by the respective student and teacher transformer networks can be used as the representative feature representation for the input image 302. In the embodiment shown, the converged feature representation for the input image is based on the feature representations learned for the input image 302 as paired with alternat image 306. However, the number of different paired images processed for a single input image 302 to train the network can vary. For example, in some embodiments, at 304 the paired view generation component 104 can generate several (e.g., two, three, five, ten, etc.) different alternate image versions for the same input image 302. The paired image generation component 104 can further group the alternate image versions and/or the input image into different pairs which the training component 114 can process through the parallel arms of the student and teacher networks to converge on intermediate feature representation for each pair. The training component 114 can further combined the intermediate feature representations generated for each pair into a final feature representation for the input image 302.

The training component 116 can perform process 300 for each input image included in the set of training images 126 to train the student and teacher networks in parallel to generate a converged feature representation for each of the training images 126, represented in system 100 as training feature representations 132. The indexing component 118 can further store the training image feature representations 132 in an indexed data structure (e.g., indexed image-feature data 134) with their corresponding training images and/or information identifying their corresponding training images (e.g., an image identifier and its stored network location for accessing the corresponding training image as stored in the medical image data 128).

Upon completion of this self-supervised training process, either the student transform network 308 or the teacher transformer network 310 can be employed as the transformer network 116. In this regard, because both the student and the teacher transformer networks are trained until they converge on the same output, the parameters of the respective networks will be the same or substantially the same. In this regard, once training has been completed, the transformer network 116 can correspond to the trained version of the student or the teacher, or a combined version of both the student and the teacher transformer networks.

As noted above, the self-supervised training process 300 is driven by the assumption that the paired alternate image versions 305 are similar enough to one another (and/or the input image 302) such that their feature representations are similar to the that of the input image 302 in latent space. In natural image problems, typical augmentations include random adjustments to the input image to generate an alternate image version, such as random cropping, random brightness adjustments, random rotation, etc. However, for medical imaging problems, each image can have multiple anatomies and varying acquisition schema (among other complex visual properties). Accordingly, a randomly cropped or augmented medical image can have completely different semantic information than the original.

Figure 4:
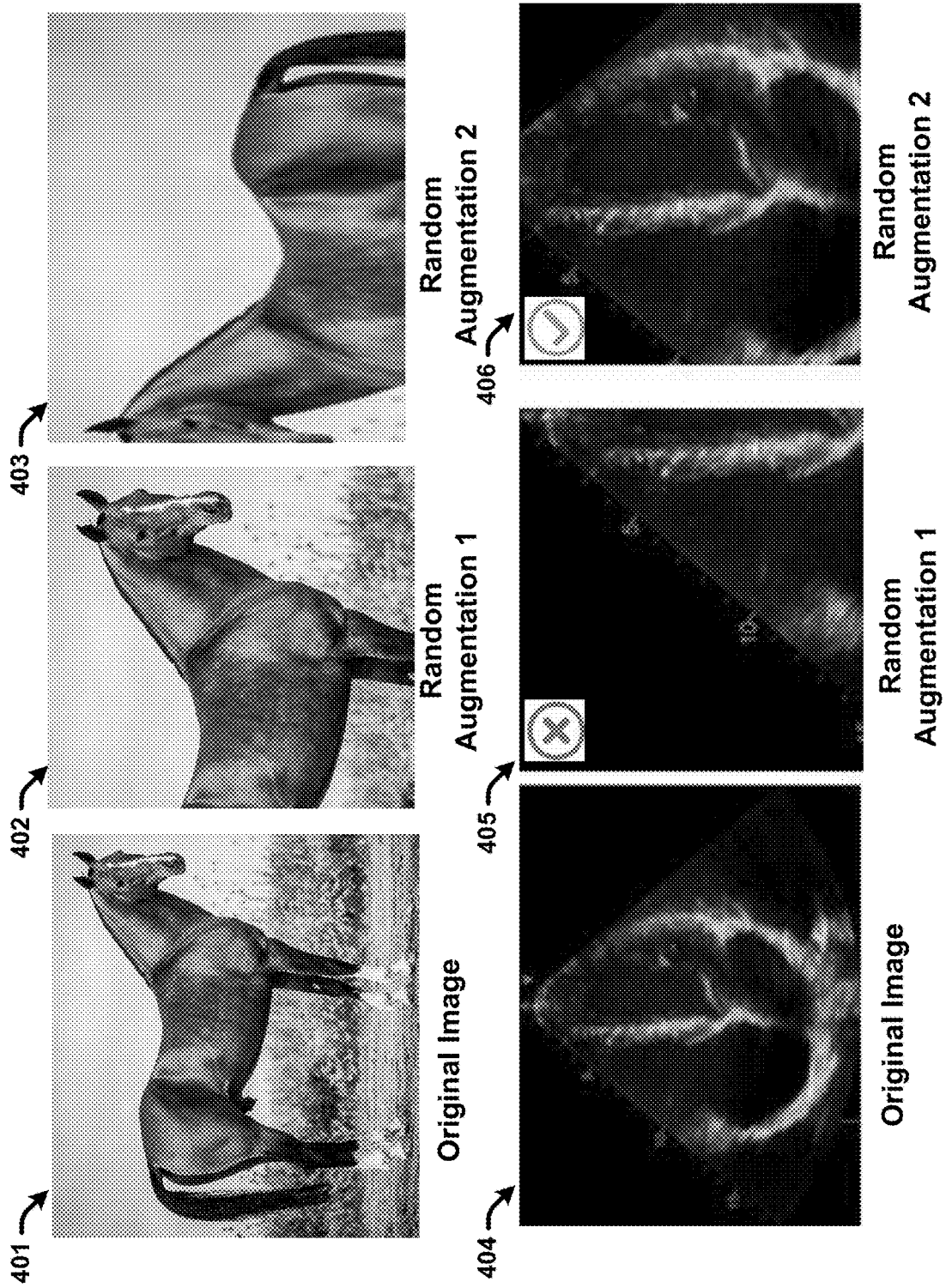
FIG. 4 presents example randomly generated alternate images for a natural image and a medical image in accordance with one or more embodiments of the disclosed subject matter.

For example, FIG. 4 presents example randomly generated alternate images for a natural image and a medical image in accordance with one or more embodiments of the disclosed subject matter. In this example, the natural image includes an image of a horse, and the medical image includes a cardiac MRI image. As illustrated in FIG. 4 when the original horse image 401 is randomly augmented to generate different augmented versions 402 and 403 (e.g., via random cropping and rotation), a human could easily view the augmented images and know they depict a horse. However, when the original cardiac MRI image 404 is randomly augmented to generate different augmented versions 405 and 406 (e.g., via random cropping and rotation), the semantic content of the augmented versions can be lost. For example, although the randomly augmented image 406 appears similar to the original cardiac MRI image, the randomly augmented image 405 does not.

One mechanism for ensuring the alternate medical image versions are semantically similar could involve manually generating the alternate images for each of the training images (e.g., manual cropping, rotation, etc.). However, this would counteract the initiative of the self-learning process 300, which is aimed at eliminating manual involvement and annotation to significantly enhance the efficiency of the feature learning process to allow for fast and automated of feature representations for any set of medical images. With this problem in mind, the disclosed techniques employ domain knowledge associated with the medical images to facilitate automatically generating meaningful alternate images versions for the medical images by the paired view generation component 104.

In particular, with reference again to FIG. 1, the paired view generation component 104 can include paired view generation schema 112 that defines one or more rules and/or protocols for generating the alternate medical image views for the training images 126, wherein the one or more rules and/or protocols are based on medical image domain knowledge information 130 associated with the training images 126. For example, the paired view generation schema 112 can define how the paired view generation component 104 should select or generate an alternate image for a given medical image based on known information about the medical image, such as the capture modality, the anatomical region or regions depicted, the type of the scan, and acquisition protocols/parameters used, patient attributes, and so on. This known information can be provided in metadata associated with the medical image, provided with the training images as auxiliary data, and/or learned by the paired view generation component 104 in association with analyzing the training images before augmentation. The level of granularity of the paired view generation schema 112 can vary. For example, in some implementations, the paired view generation schema can define the same alternate image generation protocols for all medical images, regardless of modality, anatomical region or regions depicted, acquisition protocols used, patient attributes, and so on. In other implementations, the paired view generation schema 112 can define different rules/protocols for different types of medical images, different types of modalities, different types of anatomical regions, different types of patient groups (e.g., grouped by demographic attributes and/or clinical attributes) and so on. For example, the paired view generation schema for knee MRI images may be different than the paired view generation schema for cardiac MRI images and/or spine MRI images. The paired view generation schema may also vary depending on capture modality (e.g., different for MRI relative to CT and/or XR), depending on whether a training medical image is included in a scan series (e.g., a CT scan series, and MRI scan series or the like), depending on whether a training medical image corresponds to a frame in a video (e.g., an ultrasound video scan recording), and so on.

In some embodiments, the paired view generation component 104 can include selection component 106 that selects one or more alternate images for a given training image from the medical image data 128. With these embodiments, the selection component 106 can employ known attributes about the original image and the candidate alternate images in the medical image data 128 and defined similarity criteria for the attributes as provided by paired view generation schema 112 to select the similar alternate image or images. The known attributes can be extracted from metadata associated with the respective images and/or otherwise associated with the medical images. The defined similarity criteria can include defined similarity criteria for acquisition parameter attributes, patient attributes, visual property attributes, 3D scan position attributes, and the like. For example, in some implementations in which a training medical image is included in a series, such as a CT exam series, an MRI exam series or the like, the paired view generation schema 112 may define selection criteria for selecting alternate images for the training image from the same series that is based on the relative position of the training image in the series. For instance, the selection criteria may require the alternate image to have a scan position that is spaced a defined distanced relative to the training image and captured along the same acquisition axis. In other implementations in which the training medical image corresponds to a frame in sequential frames of a video sequence (e.g., an ultrasound video sequence), the selection criteria may require the alternate image or images to include neighboring frames captured withing a defined time range relative to the training image frame (e.g., images from neighboring frames in a video sequences or 3D acquisitions or corresponding frames from different cardiac cycles).

Additionally, or alternatively, the defined similarity criteria can define similarity criteria for acquisition parameters and protocols (e.g., contrast phase, imaging frequency, reconstruction kernel size, slice thickness, radiation dose, image orientation/perspective, MR sequence, capture resolution, voxel size, scan prescription plane, scan region, bounding box, and scan time.), patient attributes (e.g., same patient, same patient demography, same pathology, same BMI, etc.), visual properties (e.g., pixel spacing, slice thickness, resolution, imaging depth, etc.) and so on. As noted above, the selection component 106 can extract/identify the relevant attributes from metadata tags associated with the respective images (e.g., DICOM tags or the like). For example, the selection criteria (defined by the paired view generation schema 112) may instruct the selection component to select one or more similar images to the training image that were acquired of the same anatomical region with the same capture modality yet with varying (e.g., withing a defined degree of similarity) acquisition parameters.

Additionally, or alternatively, the augmentation component 108 can generate the alternate image version or versions for a given training image by creating an augmented version or version (e.g., a synthetically generated edited version) of the training image using one or more defined augmentation techniques that are tailored based on the domain associated with the training image. With these embodiments, the paired view generation schema 112 can define the specific image augmentation rules for a given training image based on the training image being a medical image and/or based on other known attributes about the training image. For example, the augmentation rules can be based on a type of the training image, a modality of the training image, acquisition parameters used to generate the training image, anatomical region or regions depicted in the training image, patient attributes associated with the training image, and/or known visual properties of the training image.

For example, in some implementations in which the acquisition parameters used to generate the training image are known (e.g., included in metadata associated with the image or can otherwise be extracted from the image), the paired view generation schema 112 can define how rules for generating the alternate image version that are based on adjusting the acquisition parameters of the original image in association with generating a synthetic alternative image that ensure the semantic content is similar. With these implementations, the augmentation component 108 can generate one or more similar versions of the original training image by adjusting one or more of the acquisition parameters as defined by the paired view generation schema 112.

Figure 5:
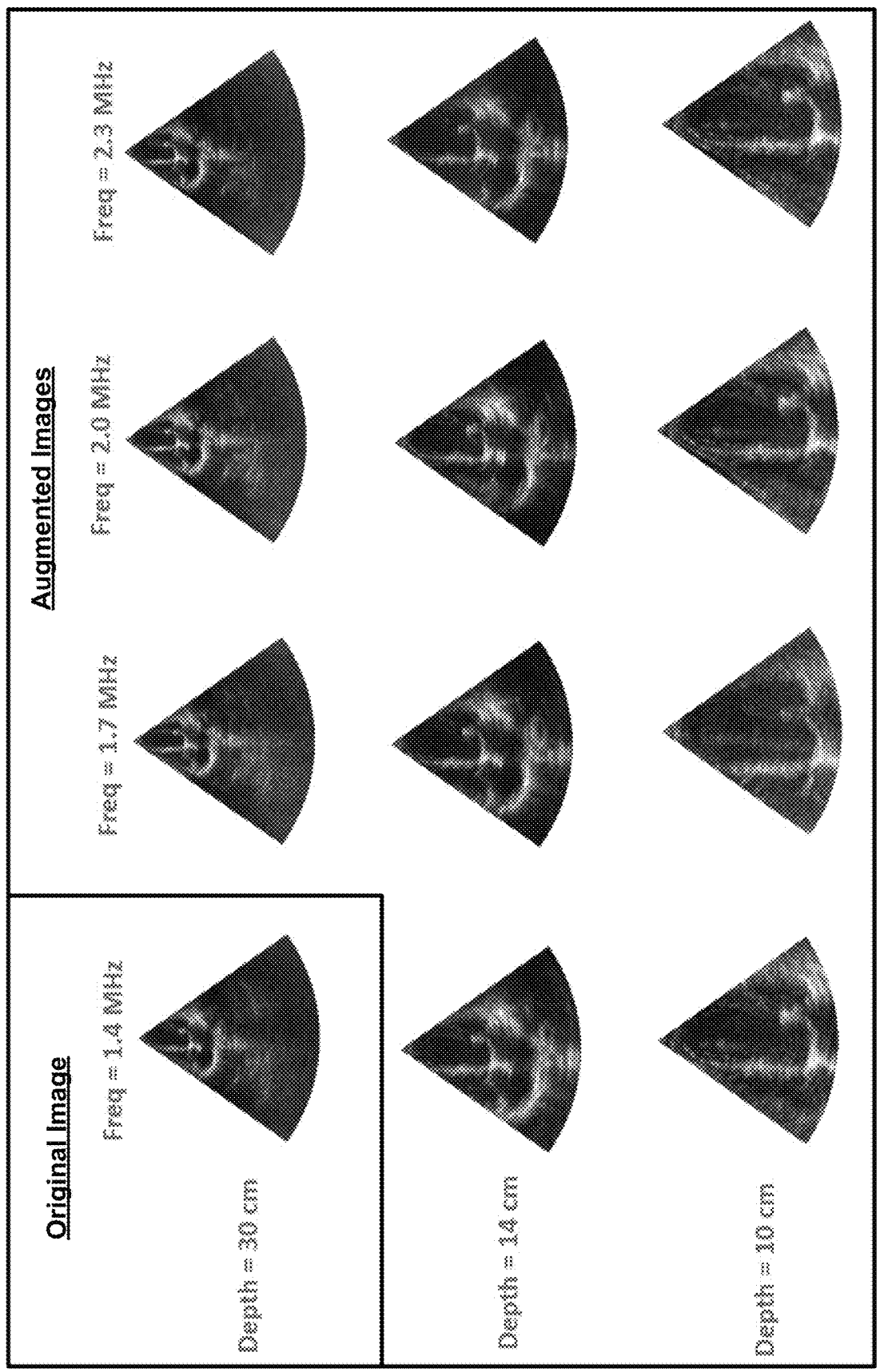
FIG. 5 presents example alternate images for a medical image generated by adapting domain specific acquisition protocols in accordance with one or more embodiments of the disclosed subject matter.

For example, FIG. 5 presents example alternate images for a medical image generated by adapting domain specific acquisition protocols. In this example, the original training image comprises a cardiac MM image captured at an original imaging depth and signal frequency (e.g., depth=30 centimeters and frequency=1.4 megahertz (MHz)). The augmented images in this example are generated (e.g., by the augmentation component 108) by adjusting the imaging depth and/or the signal frequency. It should be appreciated that the type of acquisition parameters adjusted and the manner in which they are adjusted to generate the alternate image version or versions for a given medical image can vary based on the capture modality, the anatomical region or regions scanned, and the acquisition protocols used.

With reference again to FIG. 1, in addition to and/or alternative to adjusting acquisition parameters, the augmentation component 108 can employ other defined augmentation mechanisms to create alternate image versions for a give training image, which can be tailored based on the type of the image (e.g., modality and/or anatomical region scanned) and/or other known attributes about the medical image. For example, in some implementations, augmentation schema for can define cropping bounds or cropping regions for the original image that are tailored based on the type of medical image and/or the anatomical region or regions scanned. For instance, in ultrasound images, acquisitions are generally focused on one or more objects of interest. According to this example, the augmentation schema for ultrasound images can instruct the augmentation component 108 to generate the alternate image version or versions by cropping the image a defined distance relative to the center point (e.g., a center crop).

In other embodiments, the paired view generation schema 112 can instruct the augmentation component 108 to generate one or more alternate versions for a given training image by cropping and/or rotating the image relative to one or more defined regions of interest included in the training image. For example, the defined region of interests can be based on anatomical landmarks depicted in the original medical image, tissue properties (e.g., bone verses soft tissue), scan lines, and the like. In some implementations of these embodiments, information identifying or indicating the defined regions of interest for a particular original image may be provided in metadata associated with the input image. For example, the metadata may indicate the scan range, the bounding box (e.g., for 3D acquisitions), and/or the organ or organs of interest included in the medical image. With these implementations, the augmentation component 108 can crop the original image relative to the identified or indicated region or regions of interest to generate the alternate versions.

Figure 6:
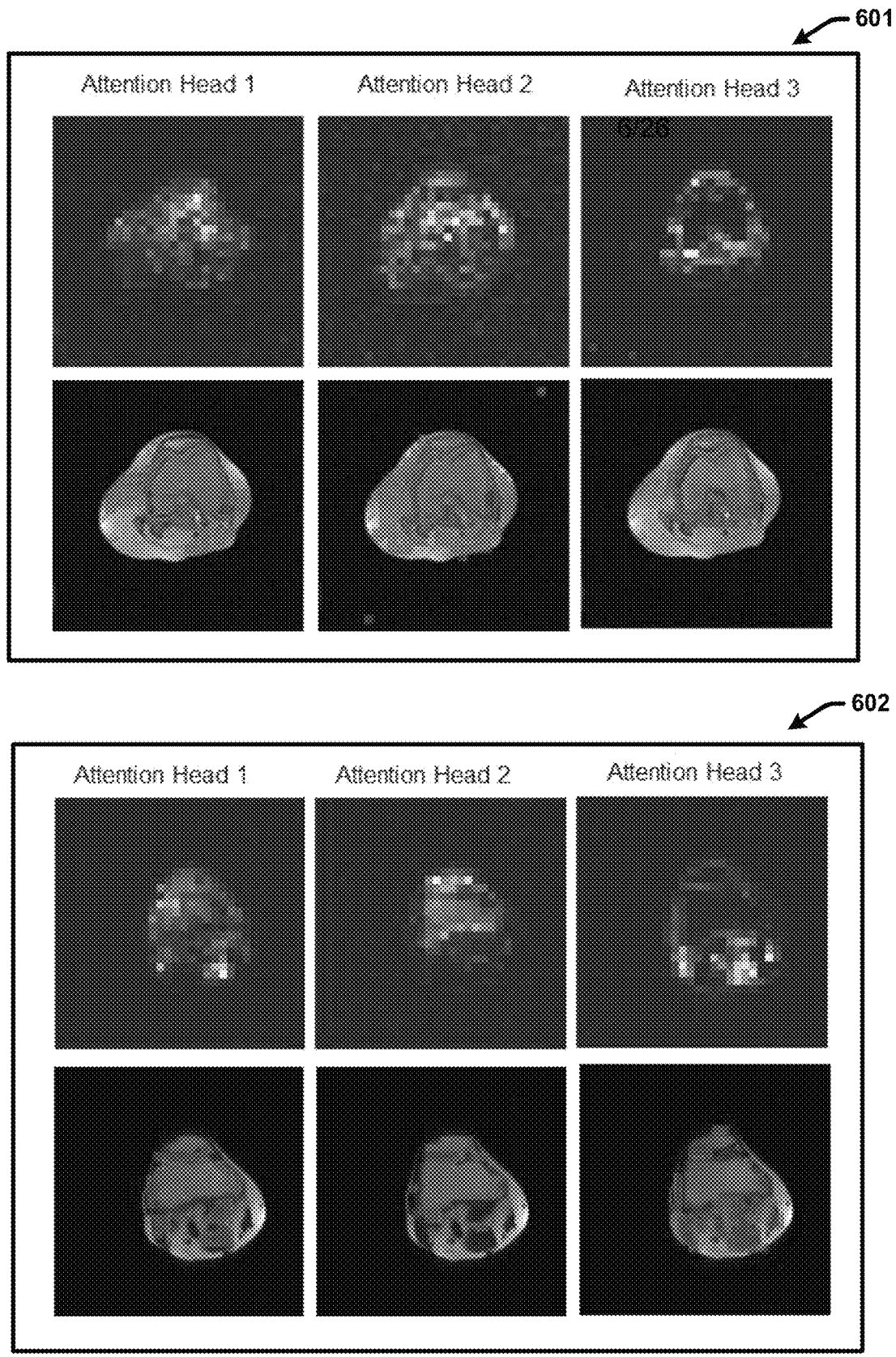
FIG. 6 illustrates example attention head maps for two different medical images in accordance with one or more embodiments of the disclosed subject matter.

In other embodiments, the paired view generation component 104 can include regions of interest component 110 to facilitate automatically identifying the region or regions of interest in the original image for which to base the cropping and/or rotating. In some implementations of these embodiments, the region of interest component 110 can determine the region or regions of interest relative to which the augmentation component 108 should perform the cropping based on feedback provided by the transformer network attention heads in association with one or more passes of the original image and/or previously generated alternate image versions through the encoder network. With these embodiments, the region of interest component 110 can examine attention head maps derived from the attention heads for different image patches to identify the particular region or regions that the attention heads consistently map to throughout the different patches, as illustrated in FIG. 6. The augmentation component 108 can further generate one or more alternate images for the original image by cropping the original image relative to the mapped attention head regions to ensure the mapped attention head regions are included in the cropped versions.

For example, FIG. 6 illustrates example attention head maps for two different medical images in accordance with one or more embodiments of the disclosed subject matter. In this example, both of the medical images included axial MM images of the knee. Image set 601 corresponds to one image while image set 602 corresponds to the second image. The upper row of images in each set corresponds to the attention head map while the lower row of images depicts the attention head maps overlaid onto the original input image. Both images were processed by the ViT network 200 to generate the corresponding attention head maps which are overlaid onto the original input images. As illustrated in FIG. 6, for both input images, the ViT network 200 attention head maps consistently point to similar anatomical regions of interest across the different images, which in this case include the bone region of the knee. These regions identified by the attention head maps can be used in guiding the view generation and driving the self-supervised learning process by retaining important landmarks in various view of the same image.

For example, with reference again to FIG. 3, in some implementations, prior to generating the alternate image version or versions for the original input image 302 at 304, the training component 116 can pass the input image 302 through either the student transformer network 308 or the teacher transformer network 310 to generate a baseline feature representation for the input image 302. The region of interest component 110 can further derive the attention head maps for the different attention heads and identify the region or regions in the original input image 302 that the attention heads focused their feature extraction. Thereafter, the augmentation component 108 can generate the one or more cropped versions of the original input image 302 for training the network based on the identified region or regions of interest. For example, the augmentation component 108 can crop the original input image 302 to include different views that include the region or regions of interest yet exclude other non-relevant portions of the input image.

Figure 7:
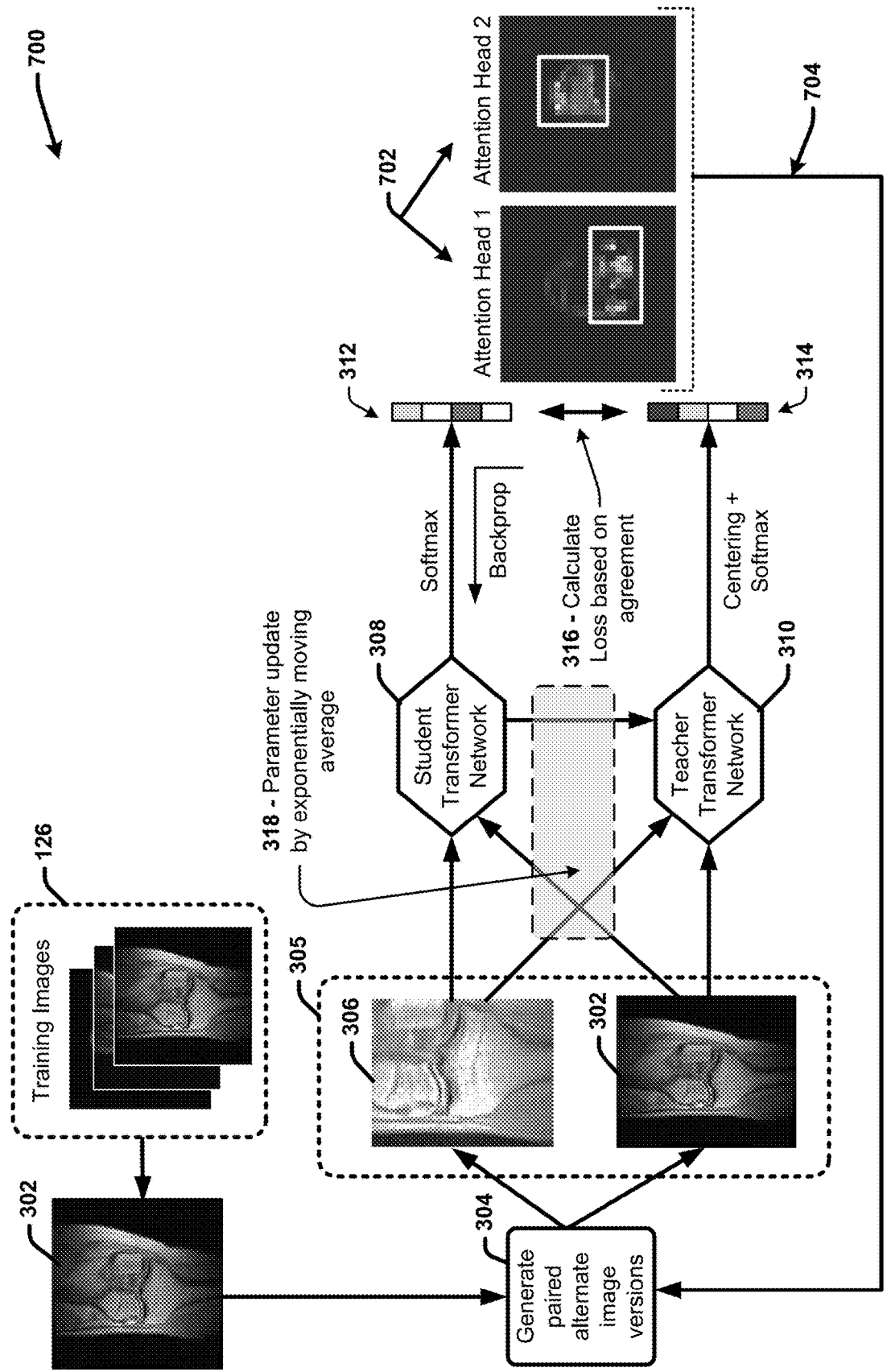
FIG. 7 illustrates another example self-supervised representation learning paradigm for medical images using parallel transformer networks in accordance with one or more embodiments of the disclosed subject matter.

Additionally, or alternatively, the region of interest component 110 can derive the attention head maps during the training process and the augmentation component 108 can use the attention head maps to iteratively generate new alternate images for the original input image in association with iteratively training the student and teacher transformer networks, as illustrated in FIG. 7

In this regard, FIG. 7 illustrates another example self-supervised representation learning process 700 for medical images using parallel transformer networks in accordance with one or more embodiments of the disclosed subject matter. Process 700 is similar to process 300 with the addition of iterative refinement of the paired view generation at 304 based on the attention head maps. Repetitive description of like elements is omitted for sake of brevity.

In accordance with process 700, the student and transformer networks can process one or more first pairs of alternate image versions 305 for a given training image 302 as described with reference to process 300 to generate the corresponding feature representations 312 and 314 for the respective images. As described with reference to processes 300 this self-supervised learning process involves iteratively updating the parameters of the respective teacher and student networks at 318 based on the agreement loss between the respective feature vectors 312 and 314. In accordance with process 700, prior to convergence of the teacher and transformer networks for a particular pair of alternate images 305, the model training can be paused and the region of interest component 110 can generate and examine the attention head maps derived from the attention heads of the respective student and/or teacher transformer networks to identify the region or regions of interest in the input images. In the embodiment shown, two attention head maps 702 are illustrated for exemplary purposes corresponding to attention head 1 and attention head 2 of the respective teacher and student transformer networks. It should be appreciated that the number of attention head maps can vary based on the number of attention heads deployed in the corresponding teacher and transformer networks. The regions of interest reflected in the attention head maps 702 are indicated by the outlined boxes. These regions of interest can be automatically identified and extracted by the region of interest component 110. Additionally, or alternatively, these regions of interest can be manually identified.

At 704, the regions of interest identified in the attention head maps 702 can further be employed to iteratively refine the alternate image view generation process at 304. In this regard, once the region or regions of interest in the attention head maps have been identified, the augmentation component 108 can generate one or more new cropped versions of the original input image 302 for continued training of the network based on the identified region or regions of interest. For example, the augmentation component 108 can crop the original input image 302 to include different views that include the region or regions of interest yet exclude other non-relevant portions of the input image and generate new alternative versions for pairing and processing by the parallel arms of distillation model. These new alternative versions are thus guided based on the outputs of the respective student and teacher transformer networks prior to completion of the training process.

Figure 8:
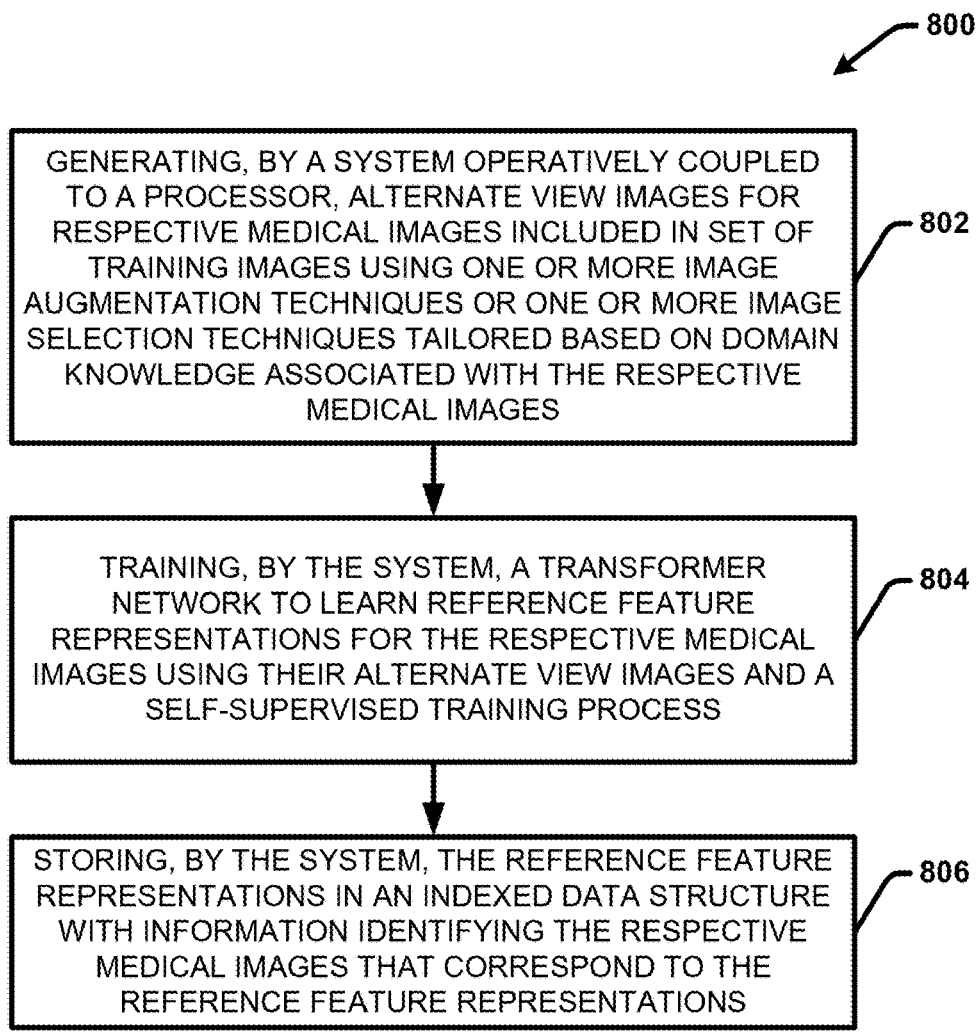
FIG. 8 presents a high-level flow diagram of an example computer-implemented process for learning feature representations of medical images using a self-supervised learning paradigm in accordance with one or more embodiments of the disclosed subject matter.

FIG. 8 presents a high-level flow diagram of an example computer-implemented process 800 for learning feature representations of medical images using a self-supervised learning paradigm in accordance with one or more embodiments of the disclosed subject matter. Process 800 provides a high-level flow diagram of the some of the primary features and functionality of system 100. Repetitive description of like elements employed in respective embodiments is omitted for sake of brevity.

In accordance with process 800, at 802, a system operatively coupled to a processor (e.g., system 100) can generate alternate view images for respective medical images included in set of training images (e.g., training images 126) using one or more image augmentation techniques (e.g., performed by the augmentation component 108) and/or one or more image selection techniques (e.g., performed by the selection component 106) tailored based on domain knowledge associated with the respective medical images (e.g., as defined based on the paired view generation schema 112). At 804, the system can train a transformer network (e.g., transformer network 116, ViT 200 or the like), to learn reference feature representations (e.g., training feature representations 132) for the respective medical images using their alternate view images and a self-supervised training process (e.g., process 300, process 700 or the like). At 806, the system can store the reference feature representations in an indexed data structure (e.g., indexed image-feature data 134) with information identifying the respective medical images that correspond to the reference feature representations.

Figure 9:
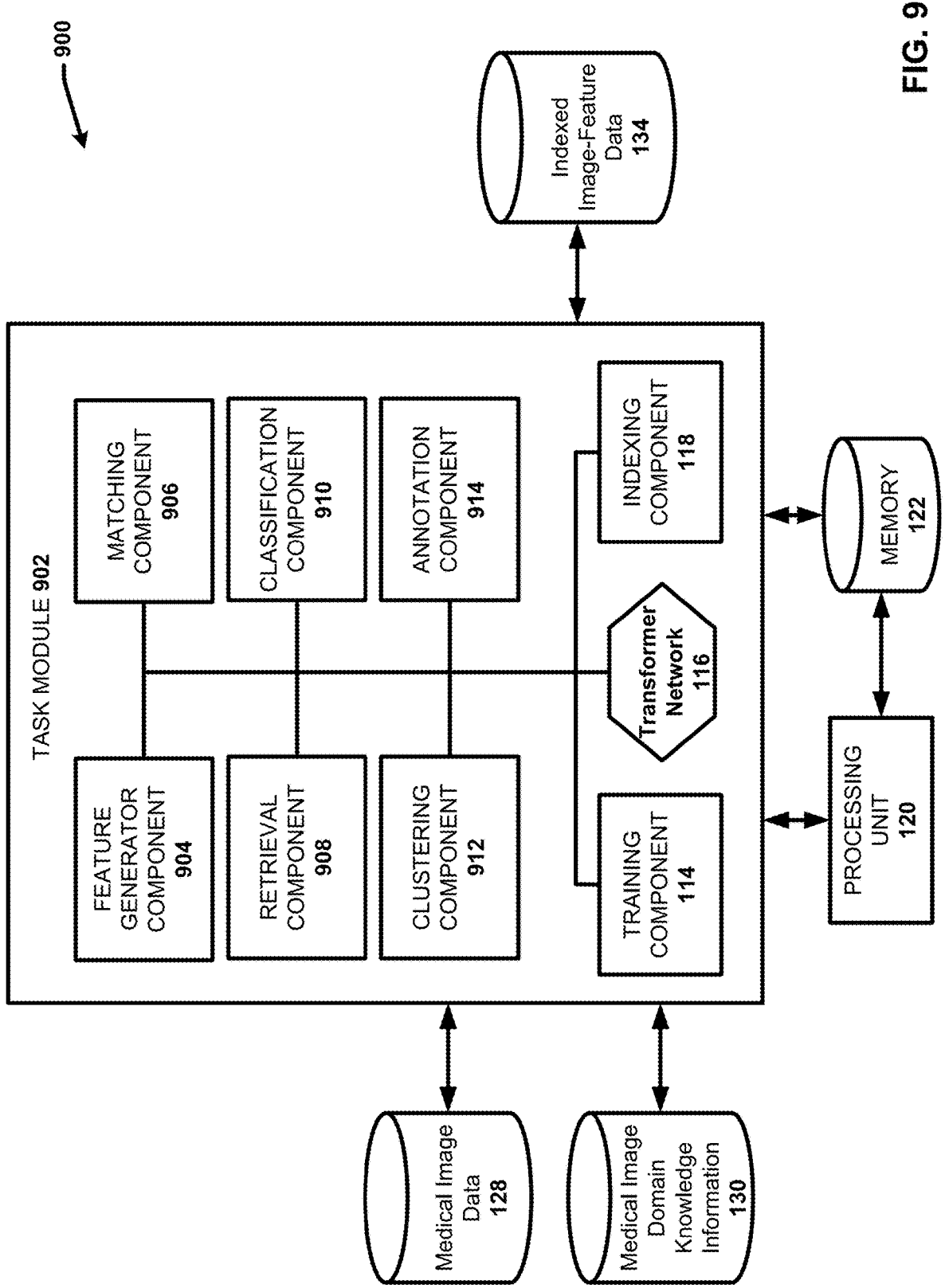
FIG. 9 illustrates an example system for employing medical image feature representations learned using a self-supervised learning paradigm for automating downstream tasks such as image retrieval, image classification and other medical image processing tasks, in accordance with one or more embodiments of the disclosed subject matter.

FIG. 9 illustrates an example system 900 for employing the medical image feature representations learned using the self-supervised learning techniques described above for automating downstream tasks such as image retrieval, image classification and other medical image processing tasks, in accordance with one or more embodiments of the disclosed subject matter. As described above, these learned feature representations can include the training image feature representations 132 learned and generated for a set of training images 126 and stored in the indexed image-feature data 134. System 900 can include same or similar elements, components as system 100 with the replacement of the feature learning module 102 with the task module 902. Although not shown, in some embodiments, system 900 can also include or be operatively coupled to the feature learning module 102. In this regard, in some embodiments, system 100 and system 900 can be combined into a same system. Repetitive description of like elements employed in respective embodiments is omitted for sake of brevity.

The task module 902 corresponds to and includes several computer executable components that facilitate employing the learned training image feature representations 132 and the transformer network 116 once trained in the manner described above to perform various tasks, including image retrieval, image classification and other medical image processing tasks. These computer executable components feature generator component 904, matching component 906, retrieval component 908, classification component 910, clustering component 912 and annotation component 914. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 122 which can be coupled to processing unit 120 for execution thereof. Examples of said and memory and processor/processing unit as well as other suitable computer or computing-based elements, can be found with reference to FIG. 26, and can be used in connection with implementing one or more of the systems or components shown and described in connection with FIG. 9 or other figures disclosed herein.

The deployment architecture of system 900 (and other systems described herein) can vary. In some embodiments, the task module 902 can be deployed at and executed by a single computing device (e.g., real or virtual) operatively coupled to the processing unit 120 and the memory 122. With these embodiments, one or more of the various data structures including the medical image data 128, the medical image domain knowledge information 130, and the indexed image-feature data 134 may also be stored locally on the same computing device and/or remotely at another device and accessed by the computing device via a wired or wireless communication network. In other embodiments, one or more components of the task module 902 can be deployed at two or more separate communicatively coupled computing devices operating in a distributed computing environment. The separate computing devices can be communicatively coupled via one or more wired or wireless communication networks. With these embodiments, one or more of the various data structures including the medical image data 128, the medical image domain knowledge information 130, and the indexed image-feature data 134 may also be stored locally on the same computing device and/or remotely at another device and accessed by the components of the task module 902 via a wired or wireless communication network. Various alternative deployment architecture variations can also be used.

The feature generator module 904 can employ the transformer network 116 once trained on the training images 126 in the manner described above to generate feature representations for new medical images. In particular, the feature generator module 904 can apply the transformer network to a new medical image to generate a corresponding feature representation for the new medical image. In accordance with system 900, these new medical images can be provided by the medical image data 128. However, the source of the new medical images can vary. The type or types of new medical images that can be processed by the transformer network 116 once trained can include essentially any medical image that was represented in the training data set. In this regard, the scope of the transformer network 116 can vary depending on the scope of the medical images included in the training data set. For example, in embodiments in which the transformer network 116 was trained on a training dataset including only knee MRI images, the scope of the new images capable of being accurately processed by the transformer network 116 will be limited to knee MRI images. It should be appreciated that the scope of the transformer network 116 can thus vary. In some embodiments, a plurality of different transformer networks can be developed using the techniques described above with reference to system 100, wherein each of the different transformer networks are tailored to a specific type of medical images. For example, the specific type of medical image may be based on anatomical region scanned (e.g., different transformer networks 116 for different anatomical regions), modality, or another factor.

The matching component 906 can further employ the feature representation for the new medical image and the training image feature representations to identify one or more of the training medical images that are similar to the new medical image based on matching the new medical image feature representation with the one or more training image feature representations. In this regard, the training image feature representations can be used as reference feature representations that can be used by the matching component 906 to match new medical images with one or more of the training medical images. Because the feature representations for the training images can be learned autonomously (e.g., without manual supervision) using the self-supervised techniques described above, the number and variation of the reference medical images is essentially unlimited. In this regard, the using the techniques described with reference to system 100, the feature learning module 102 can be used to autonomously learn and generate feature representations for a plethora of medical image datasets, making the images in these datasets searchable and usable for downstream tasks including similar image identification and retrieval. For example, medical image providers can supply large datasets of medical images to the feature learning module 102 to automatically learn and generate feature representations for all of their medical images.

The techniques used by the matching component 906 to perform the matching can vary. In general, the matching component 906 can select the matching training image or images to the new image based on the feature representations for the matching training images having a defined degree of similarity to the feature representation for the new medical image. In some embodiments, the matching component 906 can employ a k-nearest neighbors (K-NN) algorithm to perform the matching. Other feature matching algorithms are envisioned.

In some embodiments, the retrieval component 908 can further retrieve the matching training image or images for the new medical image. For example, in embodiments in which the training medical images are stored in the medical image data 128, the retrieval component 908 can retrieve the matching training images from the medical image data 128. In other implementations in which instances of the training images are stored in the indexed image-feature data 134 along with their learned feature representations, the retrieval component can retrieve the matching training medical images from the indexed image-feature data 134.

This new image to training image matching function provided by the task module can be used for variety of different use cases. For example, in some embodiments, this matching function can be used in the clinical context to find similar medical images for a given image to facilitate comparative analysis and longitudinal studies. For instance, a clinician may want to exam other medical images for same or different patients that are similar to a particular medical image to facilitate their clinical review and understanding of the particular medical image. With these implementations, the clinician can submit the new medical image for processing by the task module in association with a request to find similar images included in a database of reference medical images, wherein the reference medical images include the training images whose feature representations were previously learned. The retrieval component 908 can further retrieve and provide the matching image or images (if found) to the clinician for viewing. For example, the retrieval component 908 can provide the matching images to the clinician's device, PACs workstation, cloud-based storage system, or the like. In other embodiments, the new image to training image matching function can be used to find other medical images that match a given image in association with curating a training dataset for training a particular task model (e.g., a clinical inferencing model or the like). For example, the new medical image may correspond to an underrepresented class in training dataset used for the task model and the matching function can be used to find other medical images to balance the class in the training dataset.

Figure 10:
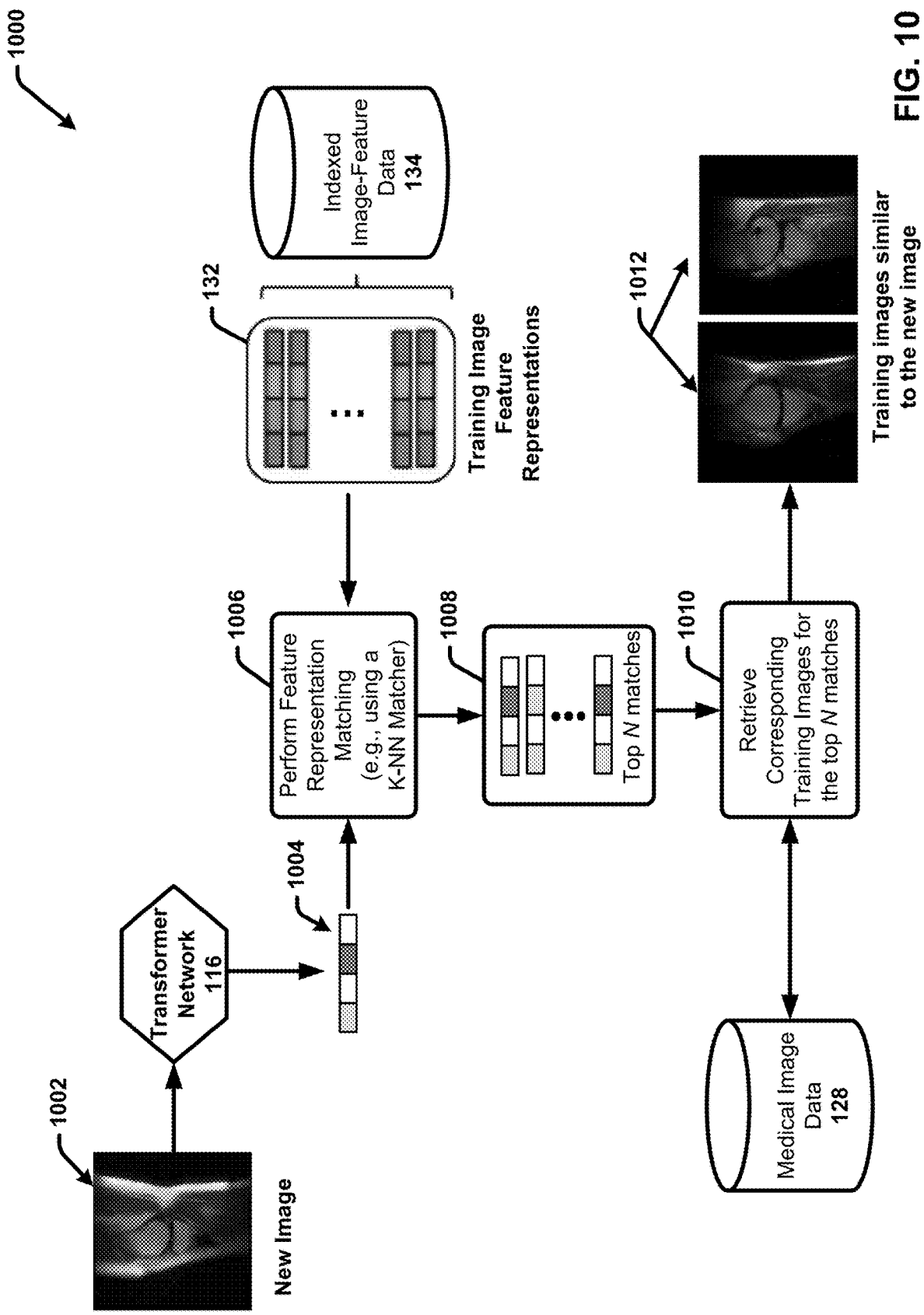
FIG. 10 illustrates an example process for preforming similar medical image retrieval in accordance with one or more embodiments of the disclosed subject matter.

FIG. 10 illustrates an example process 1000 for preforming similar medical image retrieval in accordance with one or more embodiments of the disclosed subject matter. In this regard, process 1000 provides an example process that can be performed by system 900 using the feature generator component 904, the matching component 906 and the retrieval component 908.

In accordance with process 1000, the feature generator component 904 can apply the transformer network 116 once trained in the manner described above to a new medical image 1002 to generate a feature representation 1004 for the new medical image. At 1006, the matching component 906 can employ the training image feature representations stored in the indexed-image feature data 134 to perform feature representation matching between the feature representation 1004 and the training image feature representations 132 (e.g., using a K-NN matcher or the like). The result of the matching process at 1006 will include the matching feature representations 1008 of the matching training image or images. In this example, the matching component 906 can be configured to return the top N closest matches. The number N can vary. At 1010, the retrieval component 908 can retrieve the corresponding training images for the top N matches (e.g., from the medical image data 128 or another location whether they are stored). The retrieved matching training images 1012 can further be provided to the appropriate entity or entities for usage thereof.

Process 1000 can also be used to determine whether a given new image such as image 1002 is outside the scope of the training images 126 based on an inability of the matching component 906 to find any similar images. In this regard, depending on the degree of similarity scrutiny employed by the matching component 906 to perform the feature representation matching, the matching component 906 may determine that none of the training images match the new image 1002. With these implementations, rather than returning the matching image or images, the matching component 906 can indicate to the requesting entity (e.g., the entity supplying the new image 1002 in association with a request to find matching training images) with information indicating that no matches were found.

FIGS. 11-16 present example medical image retrieval results facilitated by self-supervised learned medical image feature representations in accordance with one or more embodiments of the disclosed subject matter. The results illustrated in FIGS. 11-16 were achieved using a ViT corresponding to ViT 200 trained on a plurality of training medical images including a variety of different knee MRI images, cardiac MM images and spine MM images and the techniques described above with reference to system 100.

Figure 11:
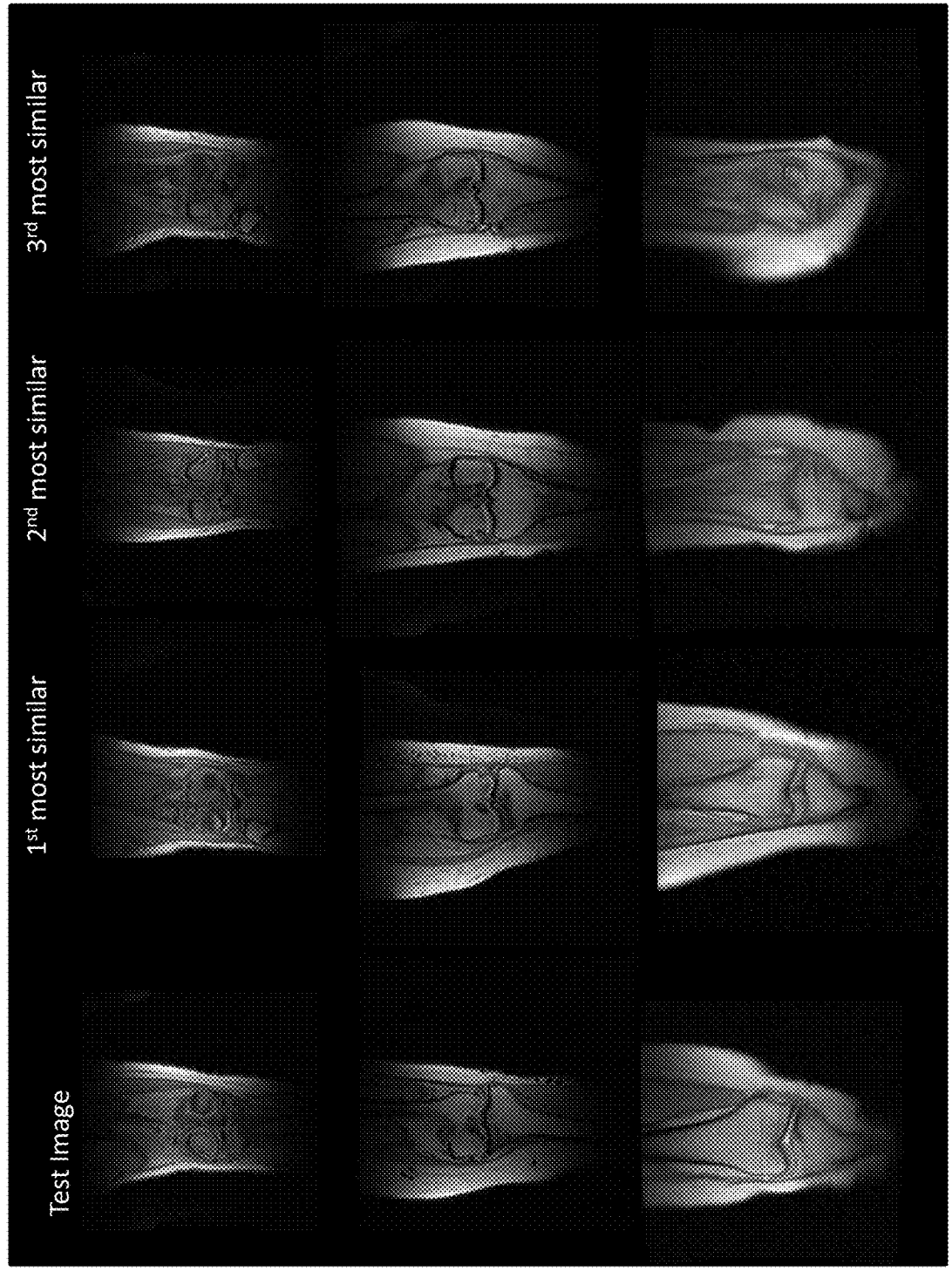
FIGS. 11-16 presents example medical image retrieval results facilitated by self-supervised learned medical image feature representations in accordance with one or more embodiments of the disclosed subject matter.
Figure 12:
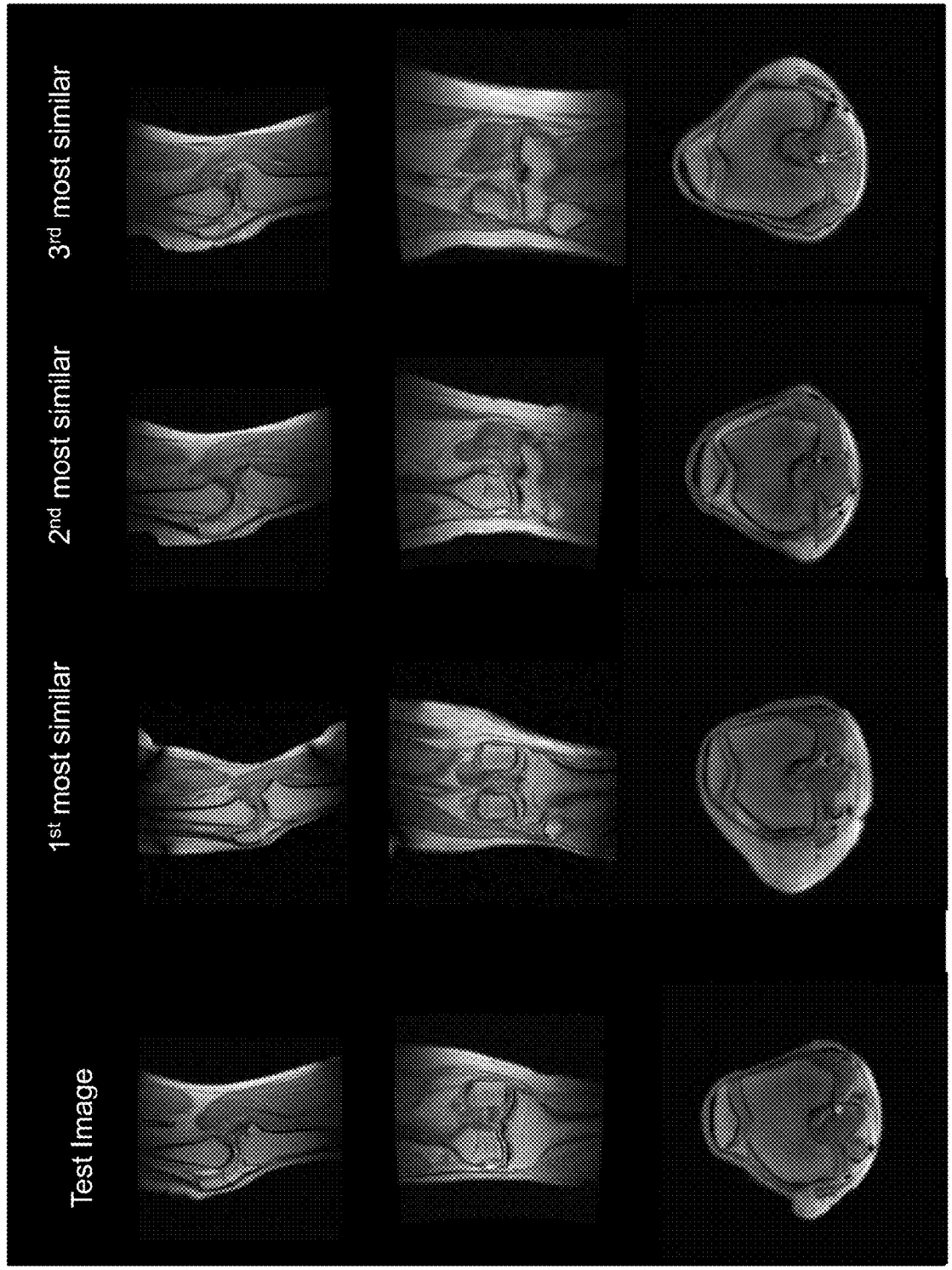
Figure 13:
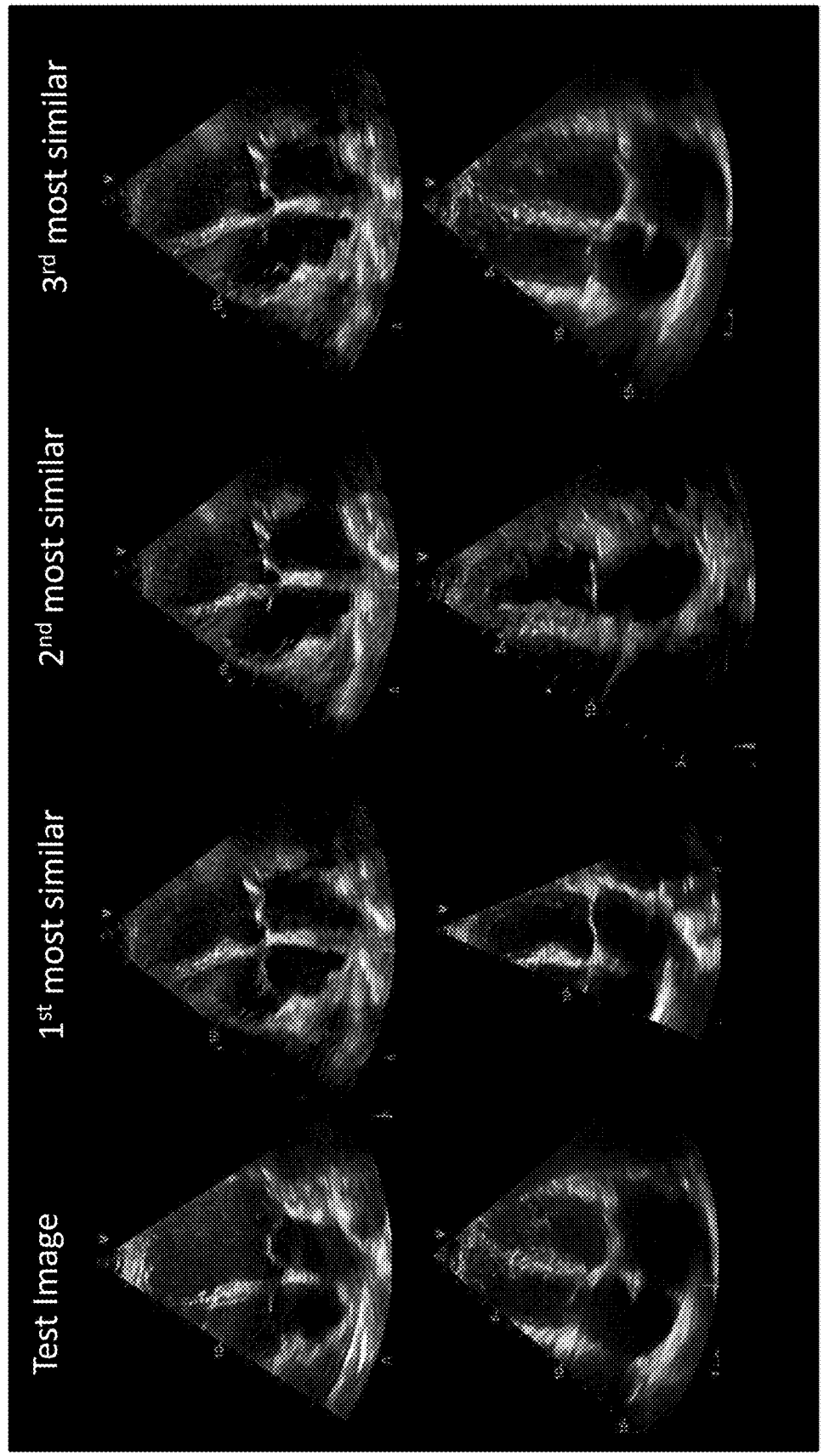
Figure 14:
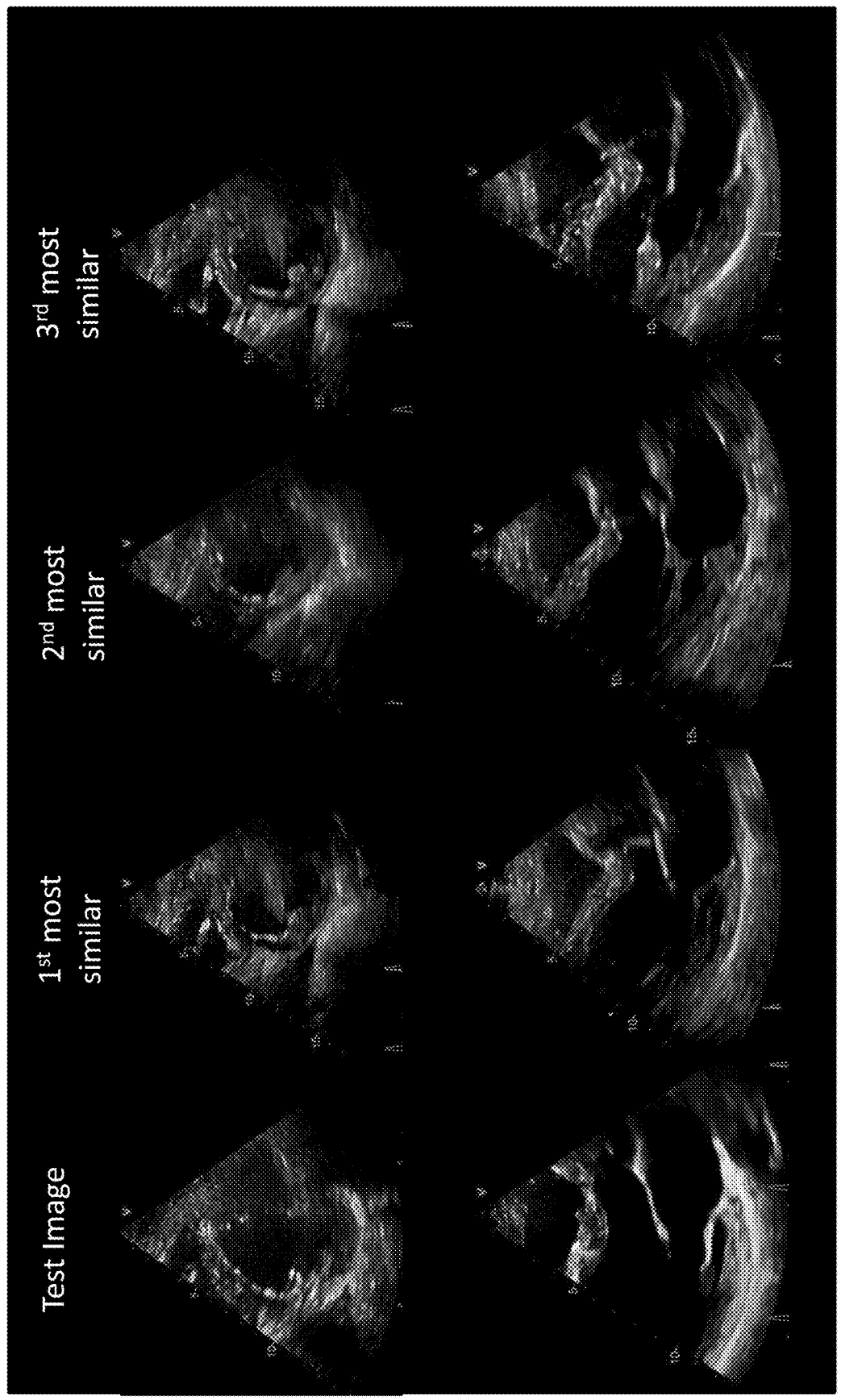
Figure 15:
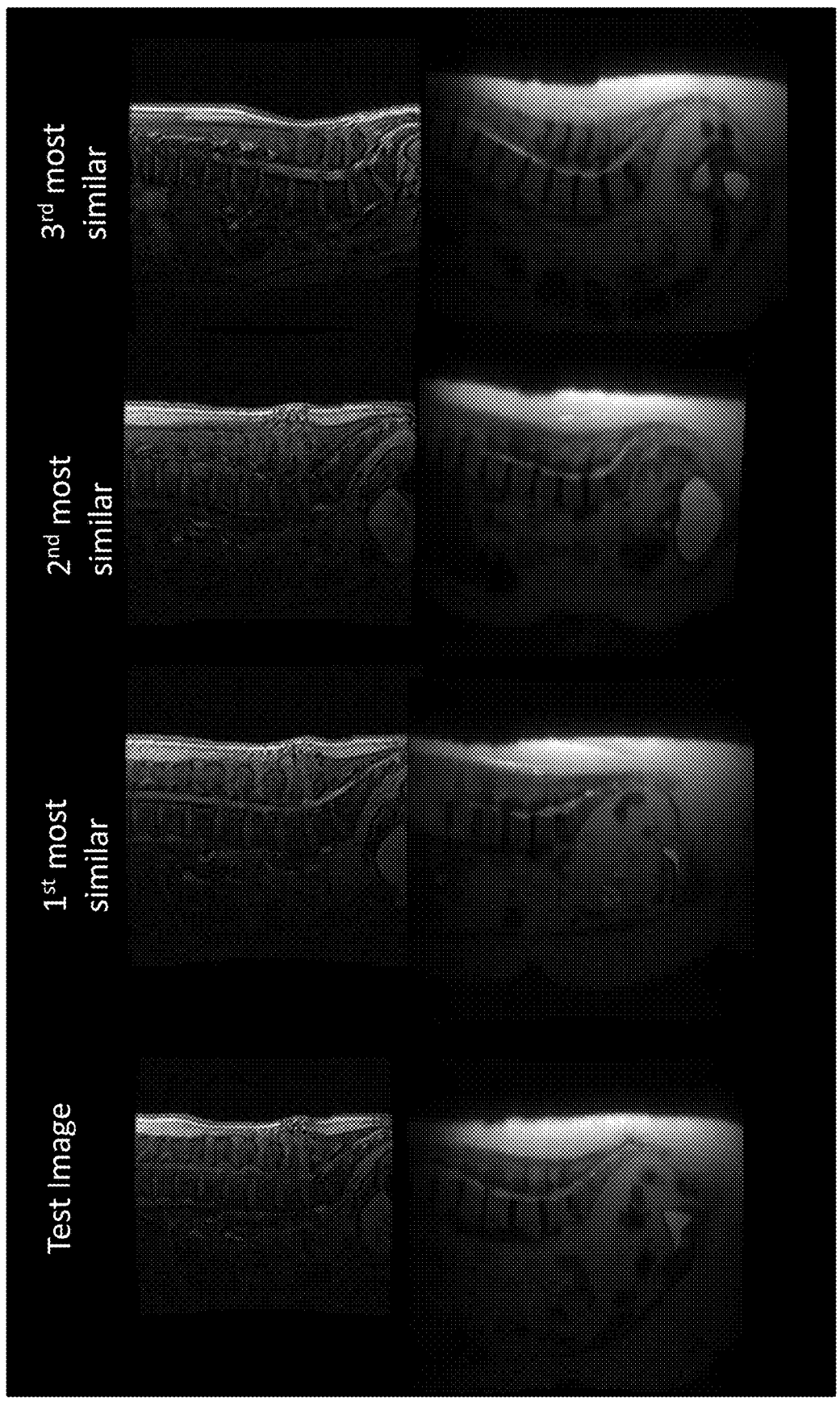
Figure 16:
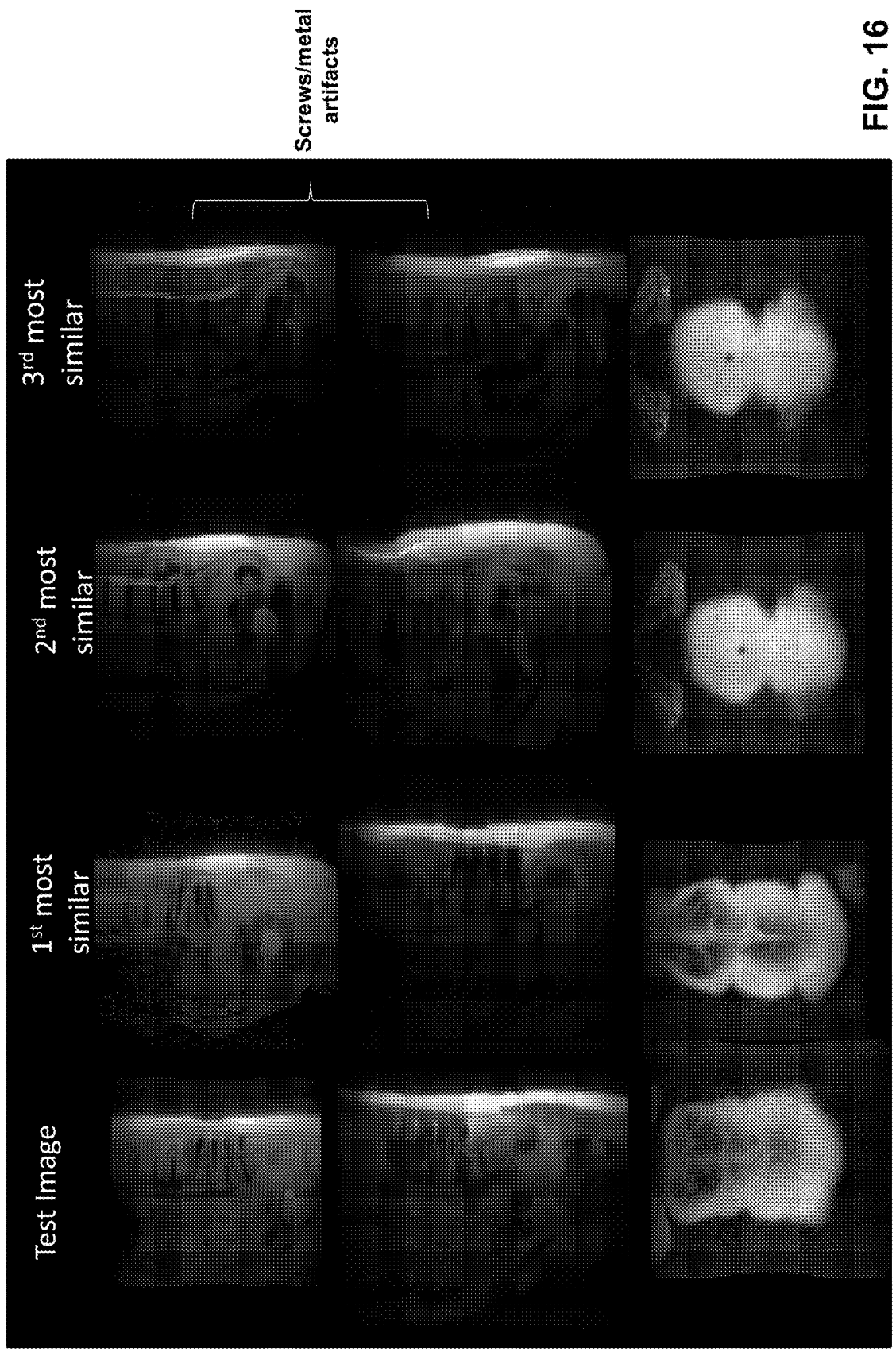

The features learned for each of these training medical images were then stored. Once trained, the ViT was applied to the test images in each of these categories (e.g., knee, cardiac and spine MRI images) to generate their corresponding feature representations. The feature representations for the test images were then used to find the top three most similar training images whose feature representations where most similar to the test image feature representations. FIGS. 11 and 12 present the similar image retrieval results for different knee MM test images. FIGS. 13 and 14 present the similar image retrieval results for different cardiac MM test images, and FIGS. 15 and 16 present the similar image retrieval results for different spine MM images. As can be seen by the similar image retrieval results, the top three similar training images for all of the test images are highly similar to their test images, demonstrating the efficacy of the disclosed techniques for similar image retrieval. In this regard, the similar images significantly resemble their test images in terms of structure, texture and contrast. The ViT trained using the self-supervised technique disclosed herein even learned to accurately detect and represent screws and metal artifacts, as illustrated in the spine MRI images shown in FIG. 16.

Figure 17:
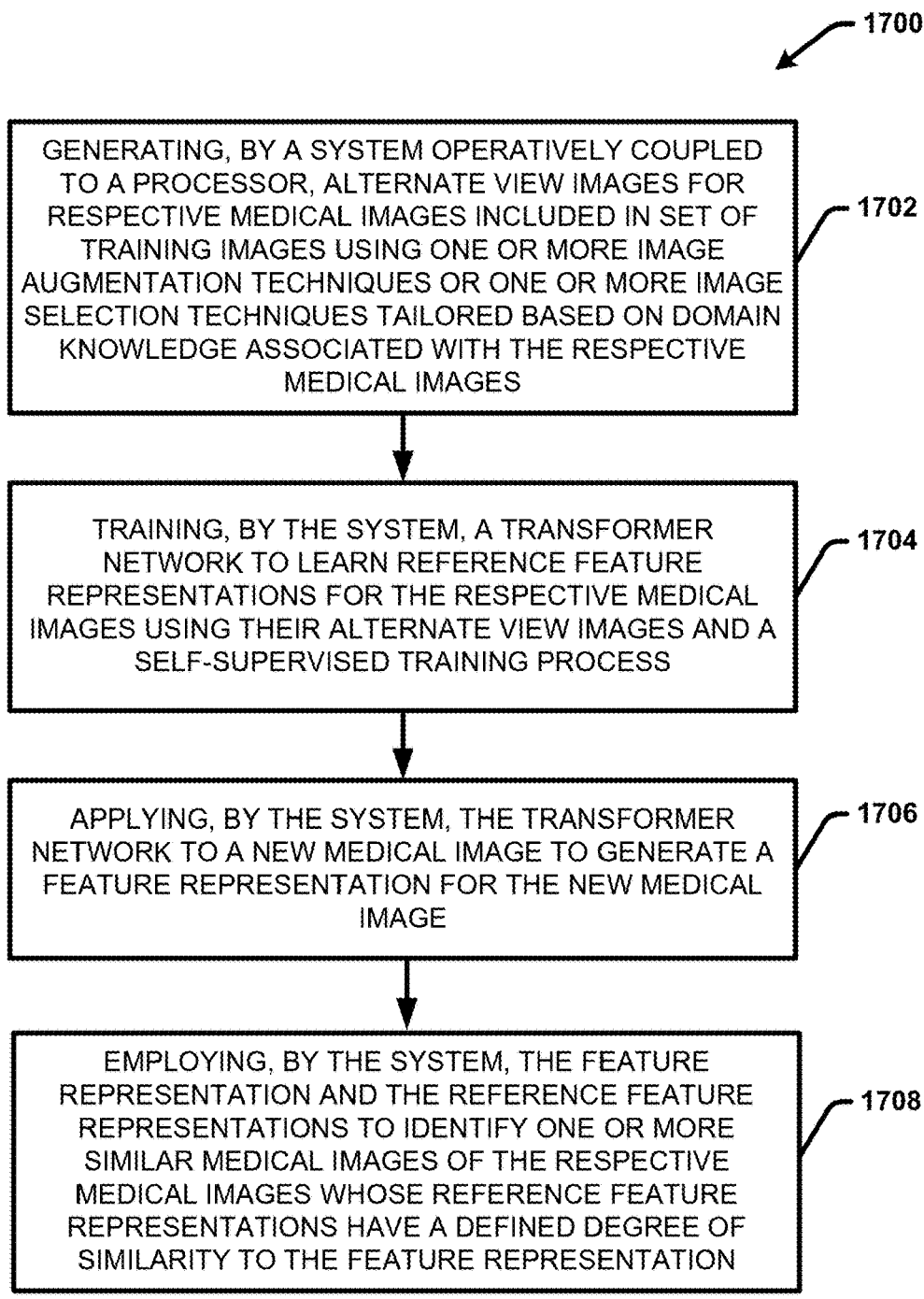
FIG. 17 presents a high-level flow diagram of an example computer-implemented process for preforming similar medical image retrieval in accordance with one or more embodiments of the disclosed subject matter.

FIG. 17 presents a high-level flow diagram of an example computer-implemented process 1700 for preforming similar medical image retrieval in accordance with one or more embodiments of the disclosed subject matter. Repetitive description of like elements employed in respective embodiments is omitted for sake of brevity.

In accordance with process 1700, at 7102, a system operatively coupled to a processor (e.g., a combination of system 100 and system 900) can generate alternate view images for respective medical images included in set of training images (e.g., training images 126) using one or more image augmentation techniques (e.g., performed by the augmentation component 108) and/or one or more image selection techniques (e.g., performed by the selection component 106) tailored based on domain knowledge associated with the respective medical images (e.g., as defined based on the paired view generation schema 112). At 1704, the system can train a transformer network (e.g., transformer network 116, ViT 200 or the like), to learn reference feature representations (e.g., training feature representations 132) for the respective medical images using their alternate view images and a self-supervised training process (e.g., process 300, process 700 or the like). At 1706, the system can apply the transformer network (once trained) to a new medical image to generate a feature representation for the new medical image (e.g., using feature generator component 904). At 1708, the system can employ the feature representation and the reference feature representations to identify similar medical images of the respective medical images whose feature representations have a defined degree of similarity to the feature representation (e.g., using matching component 906 and retrieval component 908).

Figure 18:
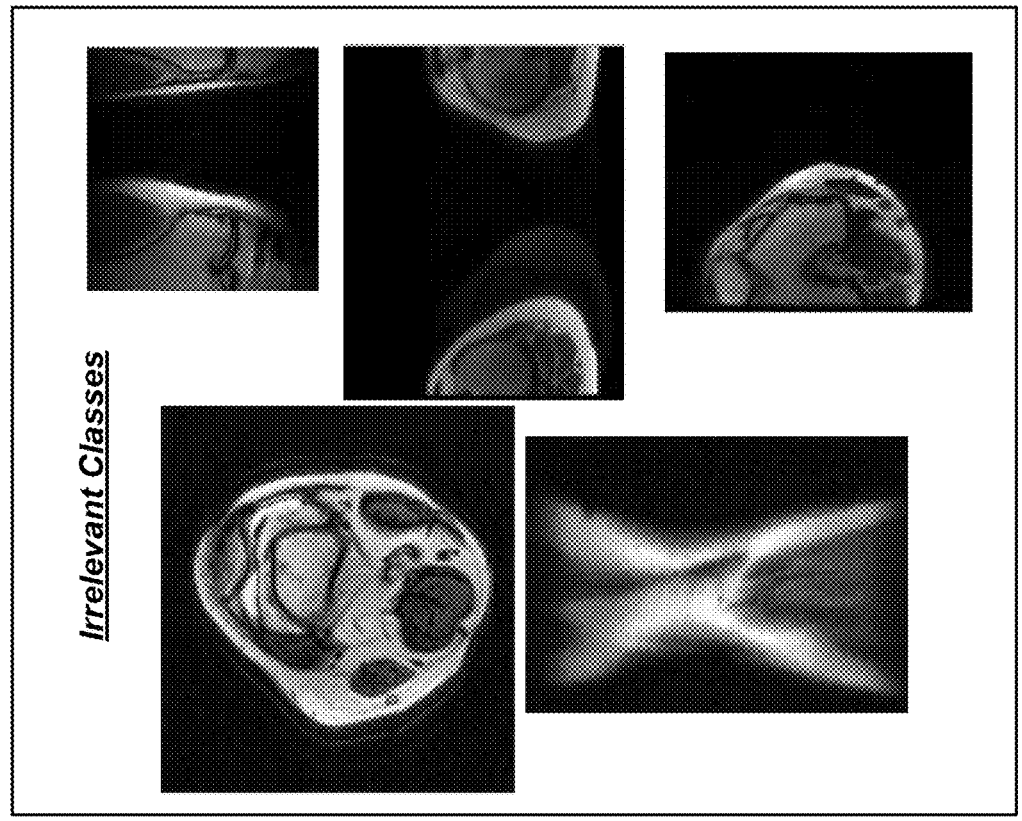
FIG. 18 provides example knee magnetic resonance imaging (MIll) image classes in accordance with one or more embodiments of the disclosed subject matter.
Figure 18:
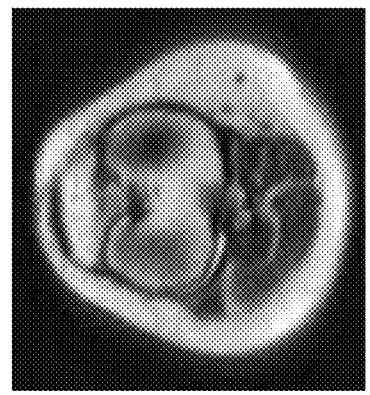
Figure 18:
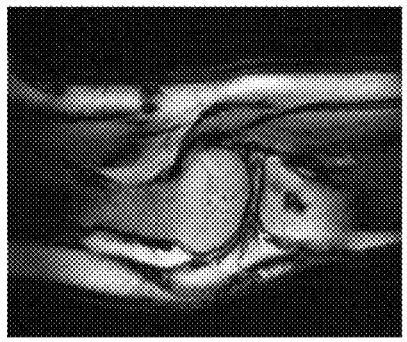
Figure 18:
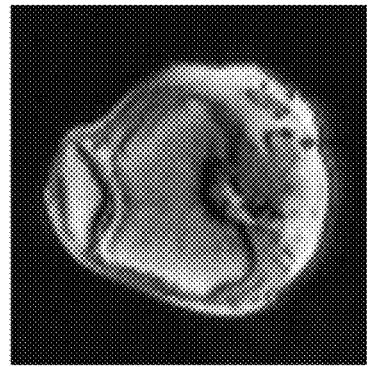
Figure 18:
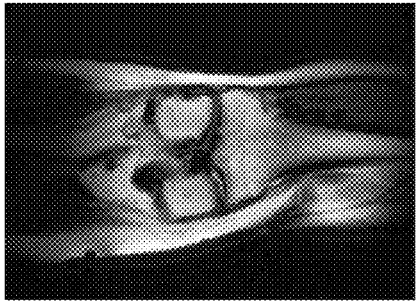
Figure 20:
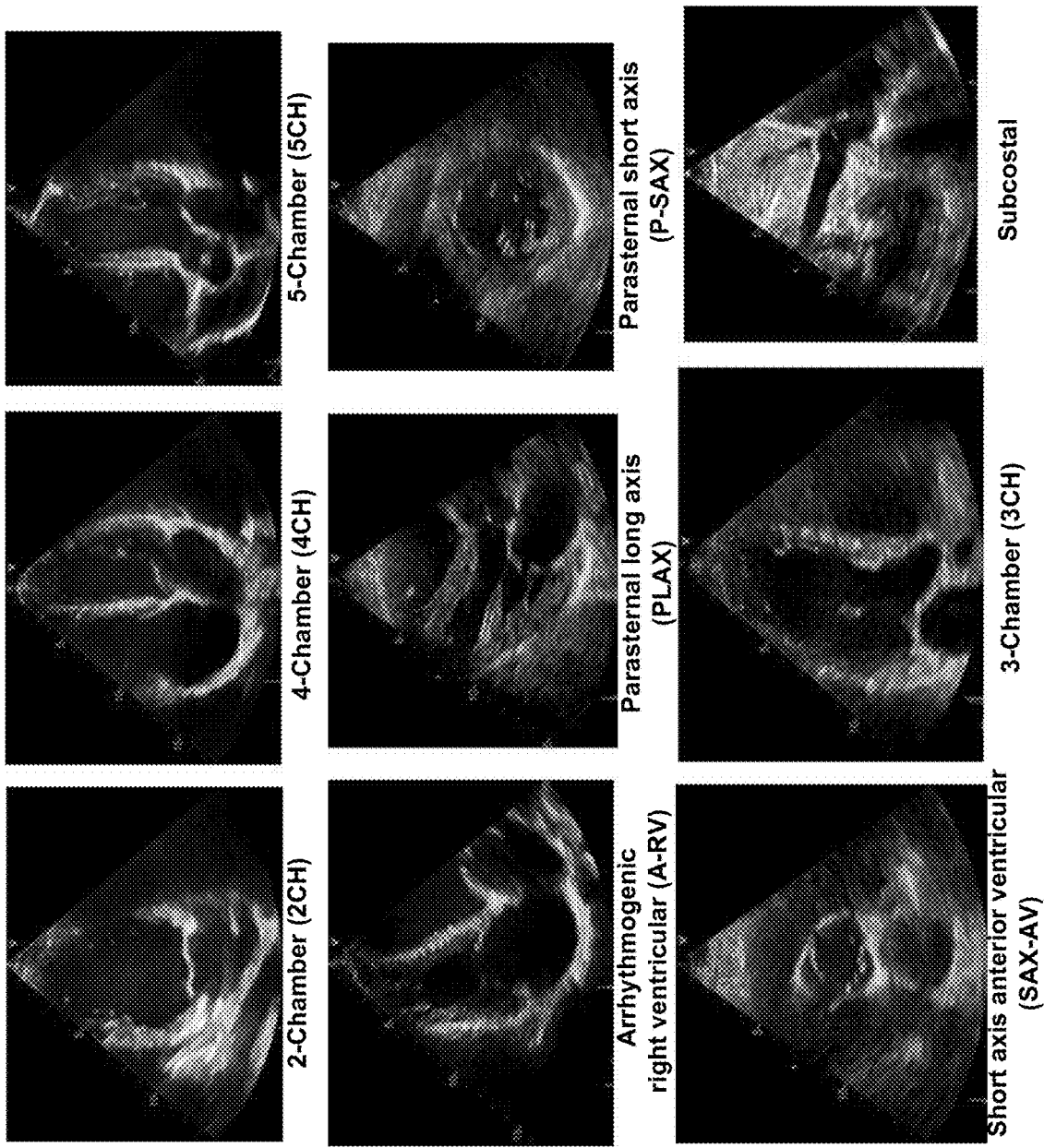
FIG. 20 provides example cardiac MRI image classes in accordance with one or more embodiments of the disclosed subject matter.

With reference again to FIG. 9, in addition to similar image retrieval, the autonomously learned feature representations for a given medical image dataset (e.g., the training images 126) can also be used for image classification tasks. For example, in some embodiments, the indexing component 118 can associate class labels (and/or other known attributes) with each of the training image feature representations in the indexed image-feature data 134. The class labels can identify a known semantic classification of the respective training images corresponding to each of their feature representations. For example, the class labels can indicate a type of the medical image, a sub-type of the medical image, and/or other known attributes about the medical image (e.g., capture modality, orientation, contrast phase depicted, anatomical region or regions depicted, and so on). The number and type of annotation labels (e.g., class labels, attribute labels, etc.) associated with each of the training image feature representations can vary. FIG. 18 provides example knee magnetic MRI image classes that can be applied to different knee MRI images and FIG. 20 provides example cardiac MM image classes that can be applied to different cardiac MRI images.

With reference again to FIG. 9, in some embodiments in which the indexed image-feature data 134 includes class labels (and/or other annotation labels) for the training image feature representations, the feature generator component 904 can employ the trained transformer network 116 to generate a feature representation for a new medical image using the techniques described above. The matching component 906 can further employ the feature representation to identify one or more similar training image feature representations stored in the indexed image-feature data 134. However, rather than returning the similar training images, the classification component 910 can employ the class labels (and/or other annotations) associated with the similar training image feature representations to determine classification information for the new image. For example, in some implementations, the classification component 910 can provide all of the class labels and attributes associated with each of the top N matching training images as classification results for the new image. In other implementations, the classification component 910 can aggregate the class labels and attributes associated with each of the top N matching training images as classification results for the new image. For example, assuming all of the top N matching training image feature representations have the same classification label (e.g., coronal knee MM), the classification component 910 can determine with a high degree of confidence that the new image also belongs to the same classification label. Additionally, or alternatively, the training component 114 can train classification model (e.g., generally referred to as a classifier) to automatically classify the training feature representations based on their corresponding classification labels (and/or other annotation labels) provided in the indexed image feature data 134. With these embodiments, once the classifier has been trained, the classification component can directly apply the classifier to the feature representation generated for the new image to output a corresponding classification for the new image.

The classification techniques described above rely on the existence of classification label and/or attribute annotations associated with the training image representations in the indexed image-feature data 134. In some embodiments, the indexing component 118 can automatically determine and apply these annotations based on information included in metadata associated with the respective training images. Additionally, or alternatively, these annotations can be manually provided. Although manual annotation ensure accurate and correct labeling of the training image classes, manual annotation of medical images can be extremely tedious, expensive and time-consuming.

To minimize the degree of manual annotation needed, in one or more additional embodiments, the training component 114 can train a classification model to automatically classify the training images based on their feature representations using a select subset of the training images/feature representations with manually applied annotations as the ground truth exemplars. With these embodiments, the clustering component 912 can facilitate selecting the subset of training images for annotation based on clustering of their corresponding feature representations. In particular, the clustering component 912 can employ one or more existing clustering algorithms to cluster the training image feature representations into different groups or clusters based on similarities and differences between their feature representations. This technique was proven to be effective at separating the semantically different classes of both knee MRI images (e.g., the different knee MRI classes shown in FIG. 18) and cardiac MRI images (e.g., the different cardiac MRI classes shown in FIG. 20) based on their learned feature representations alone, as illustrated in FIGS. 19 and 21 respectively.

Figure 19:
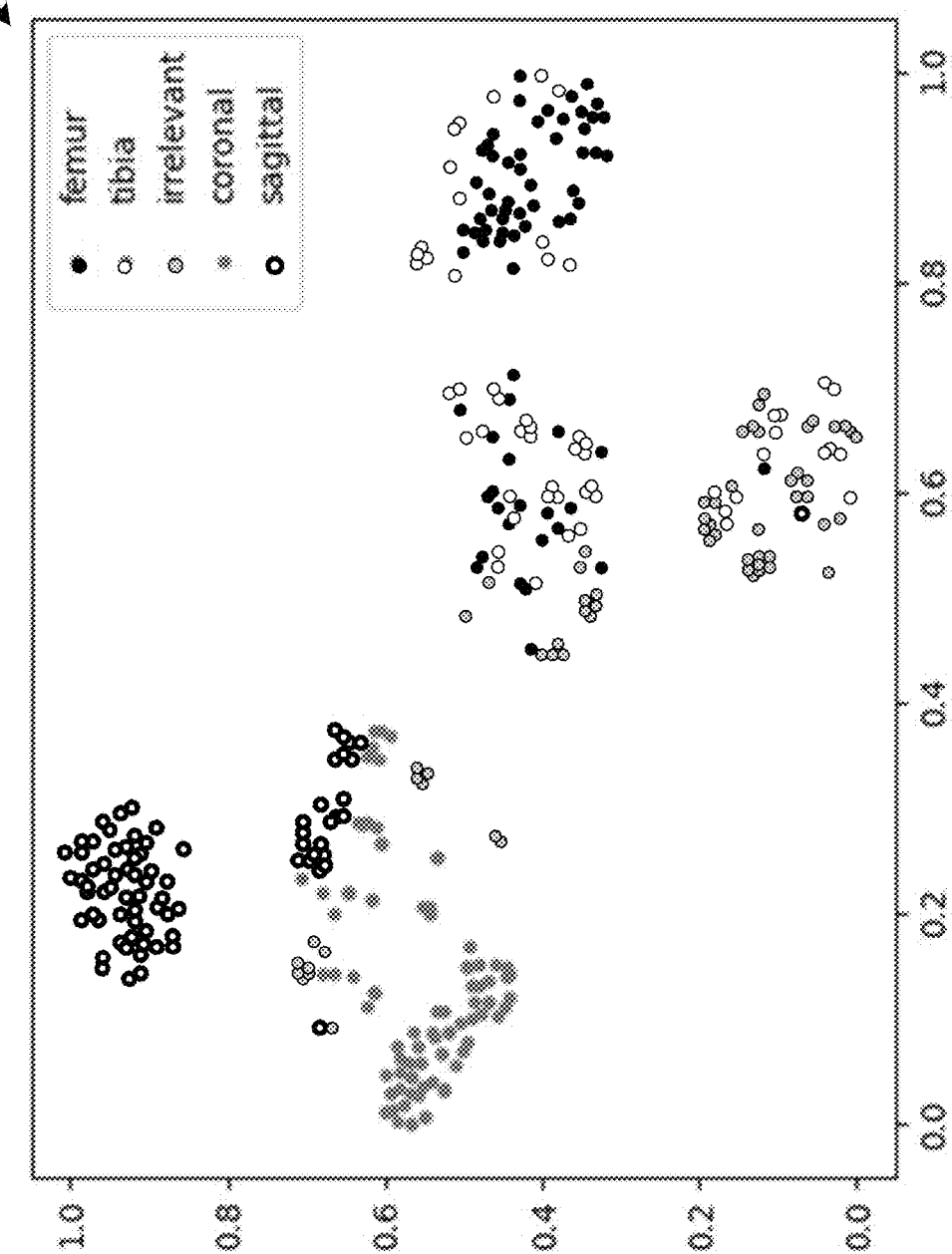
FIG. 19 presents an example t-distributed stochastic neighbor embedding (t-SNE) plot of learned feature representations for a variety of different knee MRI images in accordance with one or more embodiments of the disclosed subject matter.
Figure 21:
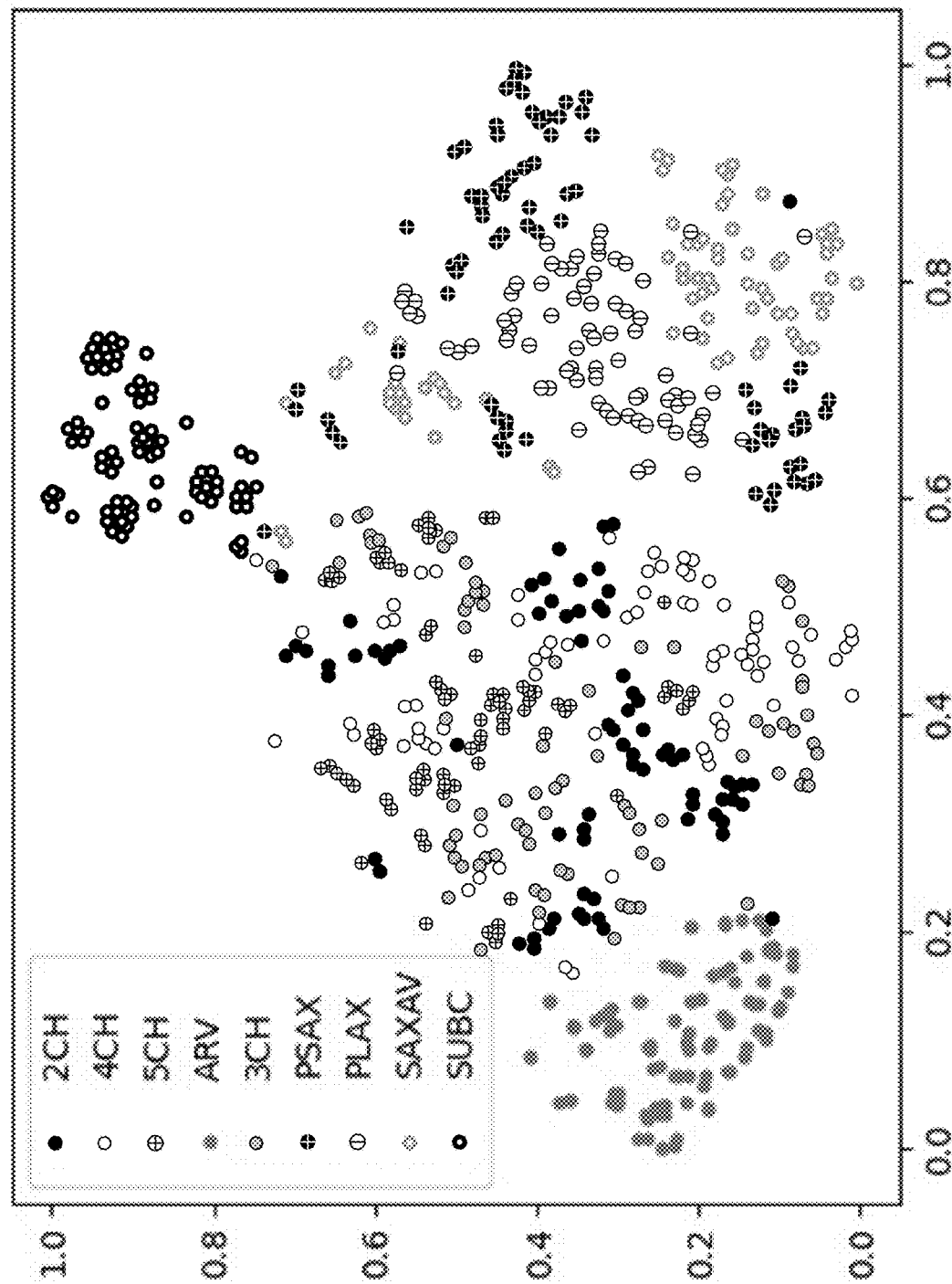
FIG. 21 presents an example t-SNE plot of learned feature representations for a variety of different cardiac MRI images in accordance with one or more embodiments of the disclosed subject matter.

In this regard, FIG. 19 presents an example t-SNE plot 1900 of learned feature representations for a variety of different knee MRI images, and FIG. 21 presents an example t-SNE plot 2100 of learned feature representations for a variety of different cardiac MRI images. In various embodiments, the clustering component 912 can generate these t-SNE plots or a similar t-SNE plot for all of the learned feature representations for the training images. In the embodiments shown in FIGS. 19 and 20, the semantic classes of each of the respective feature representations are indicated to demonstrate the ability of the clustering component to accurately group/cluster the learned feature representations into their semantic classes. As illustrated in FIG. 19, the learned feature representations for the different knee MM images can automatically be well separated into their respective semantic classes using existing clustering algorithms. The irrelevant class has a mixture of images from all classes—femur, tibia, coronal and sagittal and thus is seen intermixed with all other classes. These images include those that correspond to the irreverent knee MRI image group shown in FIG. 18. Similarly, as illustrated in FIG. 21, the learned feature representations for the different cardiac MRI images can also be automatically separated into their respective semantic classes using existing clustering algorithms. For example, the subcostal class is clearly well separated from the 2CH and 4CH classes. Although some intermixing is observed for the cardiac classes, this can be expected due to the relative similarities between the images in the intermixed classes (e.g., 4CH, 5CH and 3CH for example). However, even if points are intermixed, there are local clusters of images from the same class.

Figure 22:
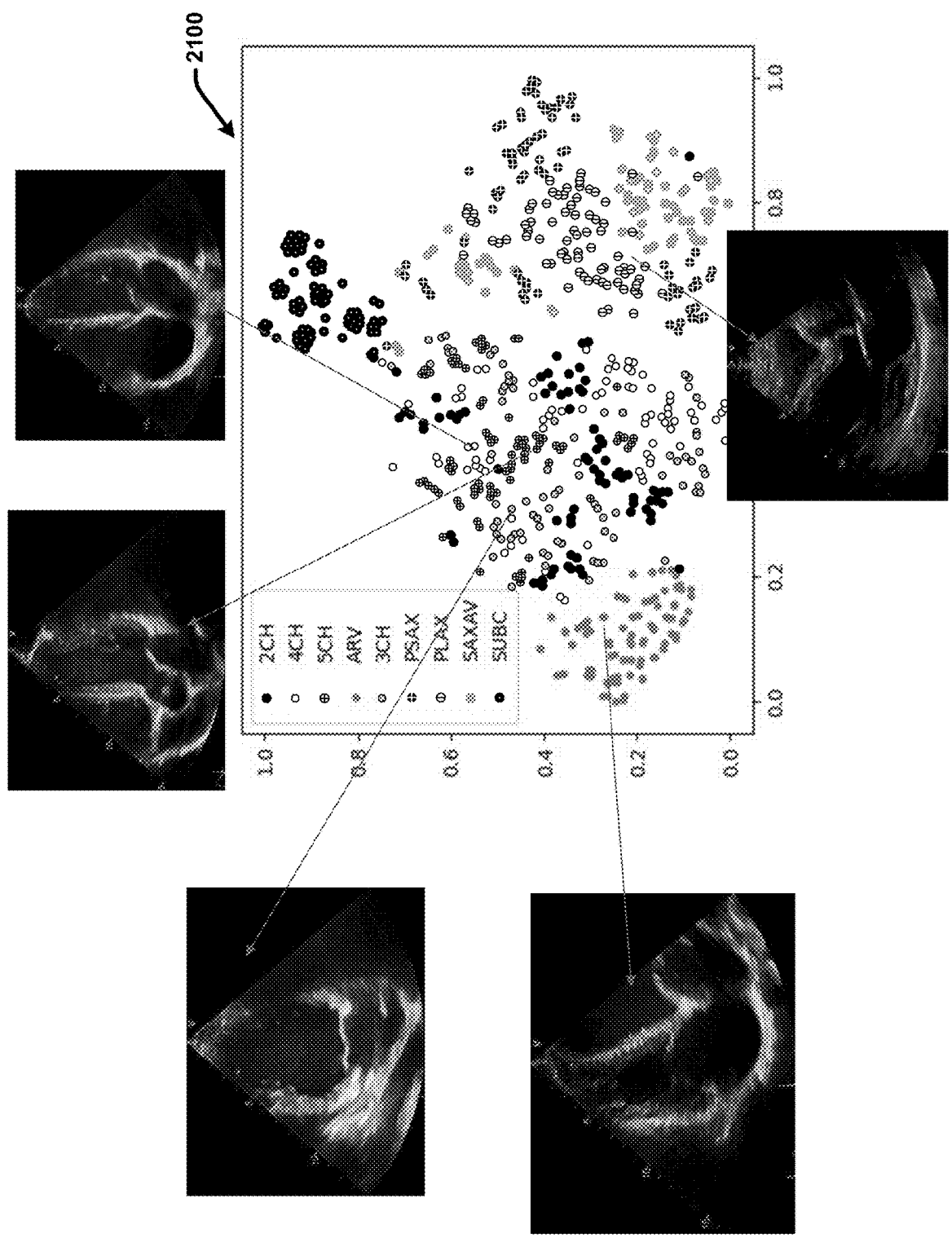
FIG. 22 illustrates representative image selection based on learned feature representation clustering in accordance with one or more embodiments of the disclosed subject matter.

With reference again to FIG. 9 in view of FIGS. 19 and 21, in various embodiments, the annotation component 914 can employ the feature representation cluster information (e.g., the tSNR plots or the information used to generate the tSNR plots) generated by the clustering component 912 to select a subset of representative images from the training images for manually annotating with classification labels and/or other annotation labels for downstream tasks. In some embodiments, the annotation component 914 can be configured to select one or more representative images for each cluster based on the relative positions of their feature representations within or around the distinct clusters, as illustrated in FIG. 22. In this regard, FIG. 22 illustrates representative image selection based on learned feature representation clustering using tSNR plot 2100 for the cardiac MM images. As illustrated in FIG. 22, in some implementations, the annotation component 914 can be configured to select one or more representative images for each cluster that corresponds to the feature representations nearest to the cluster center point. In this regard, those feature representations that are nearest the cluster centers can be assumed to most strongly correspond to the distinct class represented by each cluster. The annotation component 914 can also be configured to select representative images for those uncertain feature representations that are farthest away from the cluster centers and/or do not fall into a distinct cluster.

In some embodiments, based on selection of the representative images the annotation component 914 can provide the representative training images to one or more annotators for manual annotation (e.g., with class labels and/or other attribute labels). For example, the annotation component 914 can send the representative images to devices and/or workstations employed by one or more expert annotators via which the annotators can apply the annotations and return the applied annotations back to the task module 902. The training component 114 can further use the representative images with the applied class label annotations as the few ground truth exemplars in association with training a classification model to classify the training images based on their feature representations. Once trained, the classification component 910 can apply the classification model to a feature representation generated for a new image (e.g., by the feature generator component 904) to automatically generate classification information for the new image (e.g., to determine a class, sub-class, etc., of the new image).

Figure 23:
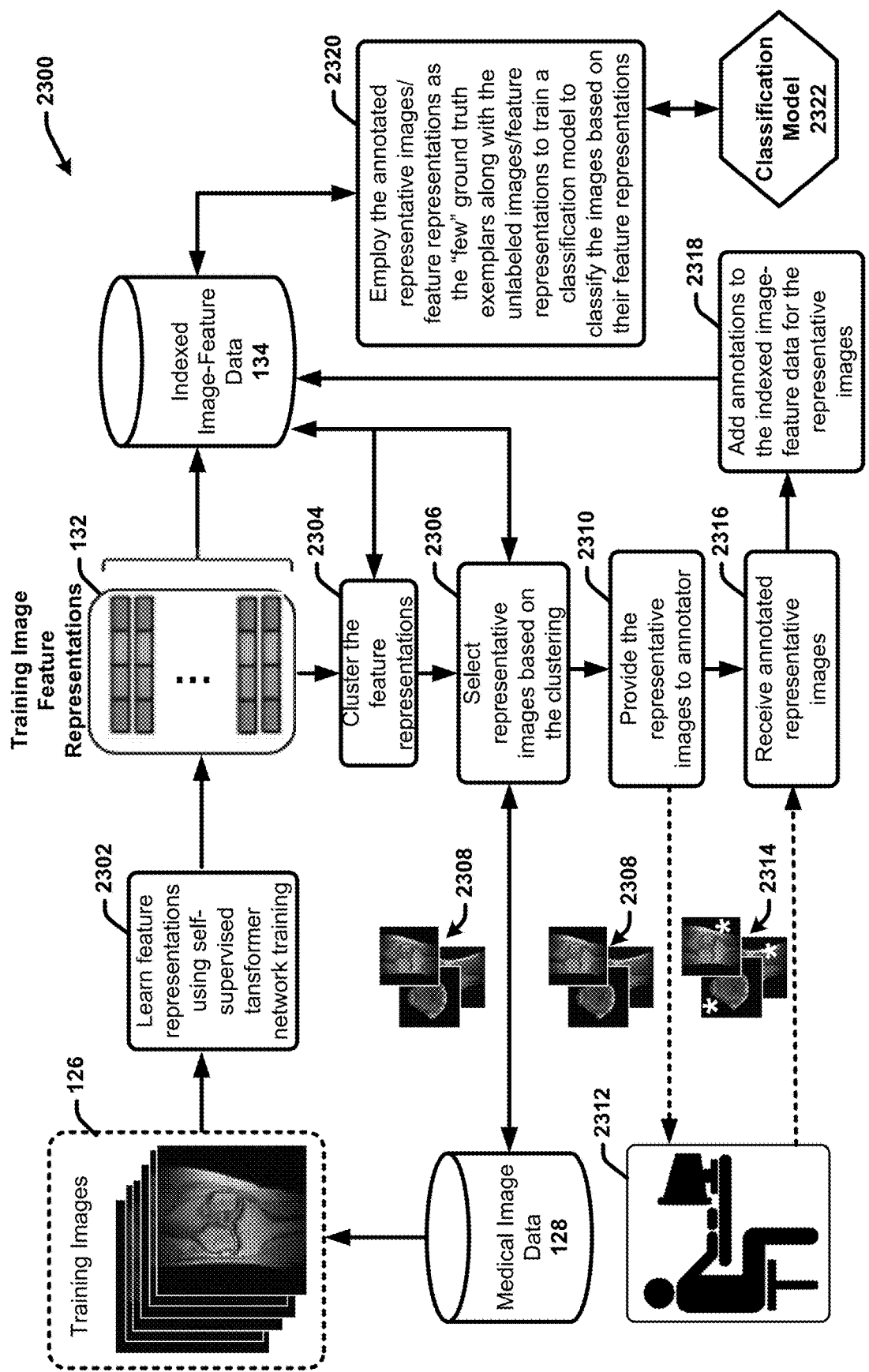
FIG. 23 presents diagram of an example processes for employing medical image feature representations learned using a self-supervised learning paradigm for automating downstream tasks such as image classification, in accordance with one or more embodiments of the disclosed subject matter.

FIG. 23 presents diagram of an example processes 2300 for employing medical image feature representations learned using a self-supervised learning paradigm for automating downstream tasks such as image classification, in accordance with one or more embodiments of the disclosed subject matter. Repetitive description of like elements employed in respective embodiments is omitted for sake of brevity.

In accordance with process 2300, at 2302, the feature learning module 102 can learn feature representations for respective images included in the set of training images 126 using the self-supervised transformer network training techniques described with reference to FIGS. 1-8. As previously described, the particular alternate image views generated for the respective training images 126 can be tailored based on domain knowledge associated with the training images 126 and defined paired view generation schema 112 associated with the training image domain. For example, the specific augmented image version and/or selected alternate image versions can be tailored based on the type, modality, anatomical region depicted and/or other known information about the training images 126. The result of the self-supervised feature learning process includes the training image feature representations 132 which can be stored in the indexed image-feature data 134 along with their corresponding training images and/or information identifying their corresponding training images.

At 2304, the clustering component 912 can cluster the feature representations into one or more distinct clusters based on similarities and differences between their feature representation using one or more existing clustering algorithms (e.g., k-means or the like). As described above, the clustering results in the respective clusters corresponding to different semantic classes of the corresponding training images. At 2306, the annotation component 914 can select representative images for class labeling (or other forms of annotation) based on the clustering of the training image feature representations 132. For example, in some implementations, the annotation component 914 can select one or more representative images for each cluster (and thus each semantic class) corresponding to the feature representations at or nearest the cluster center points. The annotation component 914 may also select representative images corresponding to the outlier feature representations that do not clearly belong to a distinct cluster. The annotation component 914 can retrieve the representative images 2308 as stored in the indexed image feature data 134 and/or at the source location in the medical image data 128. At 2310, the annotation component can provide the representative images to an annotator 2312 for class labeling. At 2316, the task module 902 can receive the annotated representative image 2314 from the annotator and at 2318, the indexing component 118 can add the annotations to the indexed image-feature data for the representative images.

At 2320 the classification component 910 can thereafter employ the annotated representative images/feature representations as the "few" ground truth exemplars along with the unlabeled images/feature representations (e.g., the remaining training images 126 that were not labeled/annotated) to train a classification model 2322 to classify the images based on their feature representations.

Figure 24:
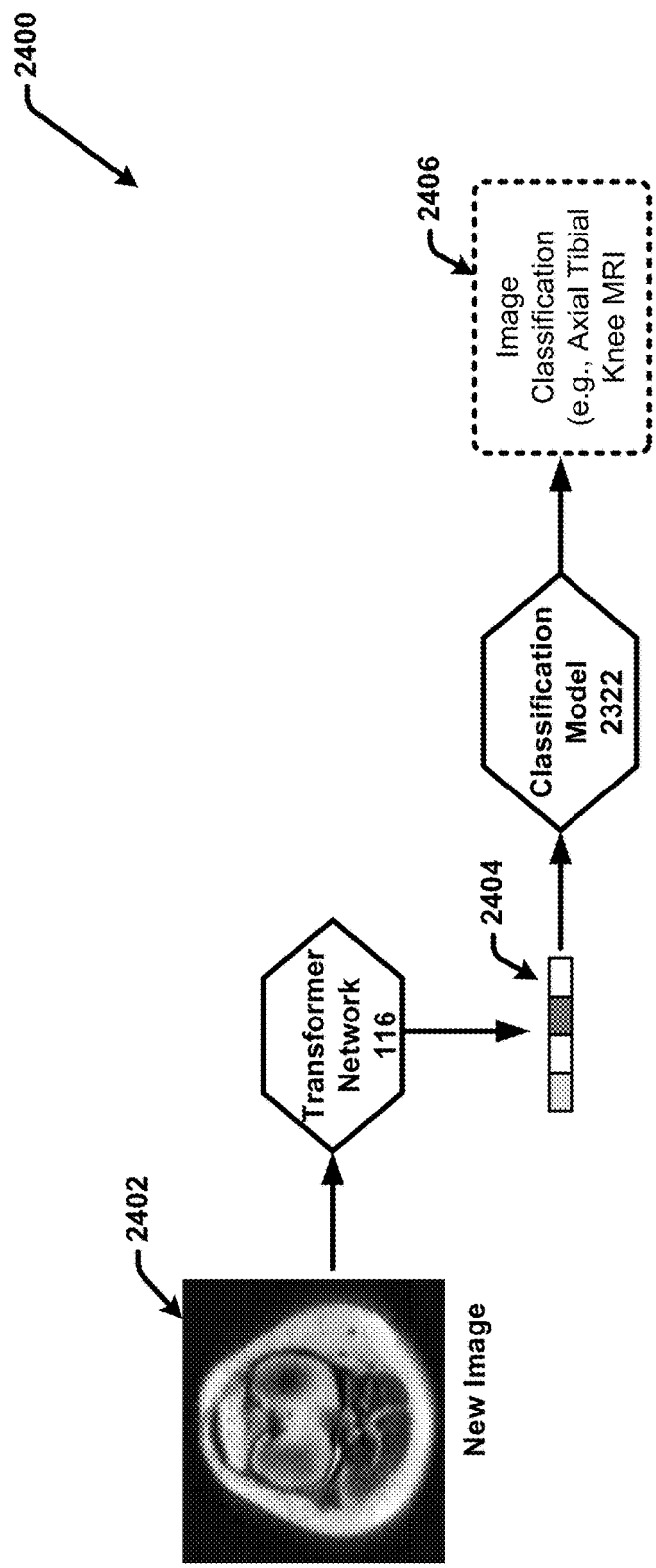
FIG. 24 presents a diagram of an example processes for performing medical image classification in accordance with one or more embodiments of the disclosed subject matter.

FIG. 24 presents a diagram of an example processes 2400 for performing medical image classification in accordance with one or more embodiments of the disclosed subject matter. Process 2400 demonstrates an example process that can be performed by the task module 902 using the classification model 2322 after training using the techniques described above. Repetitive description of like elements employed in respective embodiments is omitted for sake of brevity.

In accordance with process 2400, the task module 902 can receive a new image 2402 included in the same domain of the medical images used to train the transformer network 116 and the classification model. The feature generator component 904 can then apply the transformer network to the new image to generate a feature representation 2404 for the new image. Thereafter, the classification component 910 can apply the classification model 2322 to the feature representation 2404 to generate image classification information 2406 for the new image 2402. In this example, the classification model correctly classifies the new image as an axial tibial knee MRI based solely on its feature representation 2402.

Figure 25:
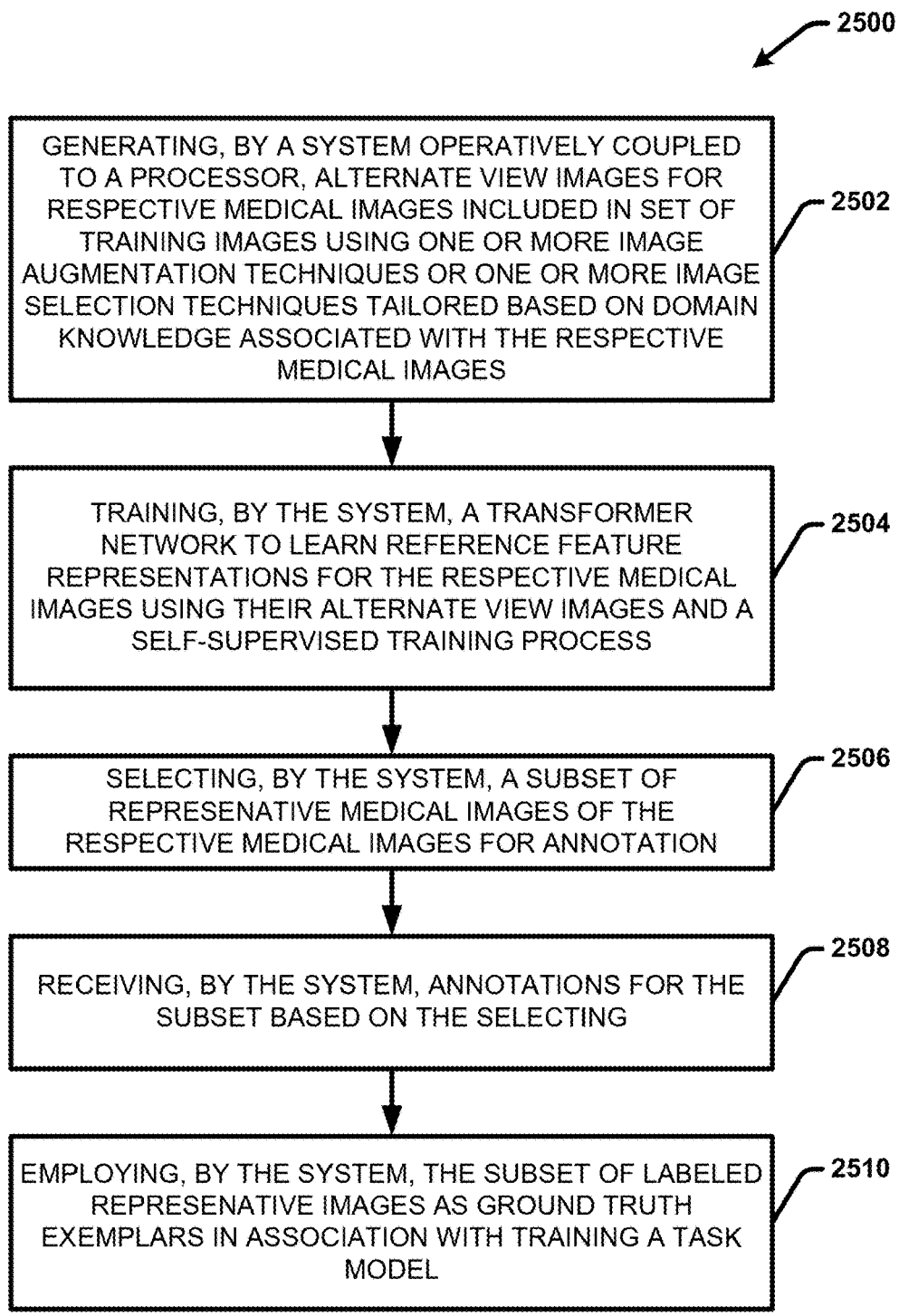
FIG. 25 presents a high-level flow diagram of an example computer-implemented process for employing medical image feature representations learned using a self-supervised learning paradigm for automating downstream tasks in accordance with one or more embodiments of the disclosed subject matter.

FIG. 25 presents a high-level flow diagram of an example computer-implemented process 2500 for employing medical image feature representations learned using a self-supervised learning paradigm for automating downstream tasks in accordance with one or more embodiments of the disclosed subject matter. Repetitive description of like elements employed in respective embodiments is omitted for sake of brevity.

In accordance with process 2500, at 2502 a system operatively coupled to a processor (e.g., a combination of system 100 and system 900) can generate alternate view images for respective medical images included in set of training images (e.g., training images 126) using one or more image augmentation techniques (e.g., performed by the augmentation component 108) and/or one or more image selection techniques (e.g., performed by the selection component 106) tailored based on domain knowledge associated with the respective medical images (e.g., as defined based on the paired view generation schema 112). At 2504, the system can train a transformer network (e.g., transformer network 116, ViT 200 or the like), to learn reference feature representations (e.g., training feature representations 132) for the respective medical images using their alternate view images and a self-supervised training process (e.g., process 300, process 700 or the like). At 2506, the system can select a subset of the representative medical images of the respective medical images for annotation (e.g., using the clustering component 912 and the annotation component 914). At 2508, the system can receive the annotations for the subset based on the selecting. At 2510, the system can employ the subset of labeled representative images as ground truth exemplars in association with training a task model (e.g., classification model 2322 or another task model).

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more of the disclosed machine-learning models (e.g., the transformer network 116, the ViT 200, the classification model 2322 and the like) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 26, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 26:
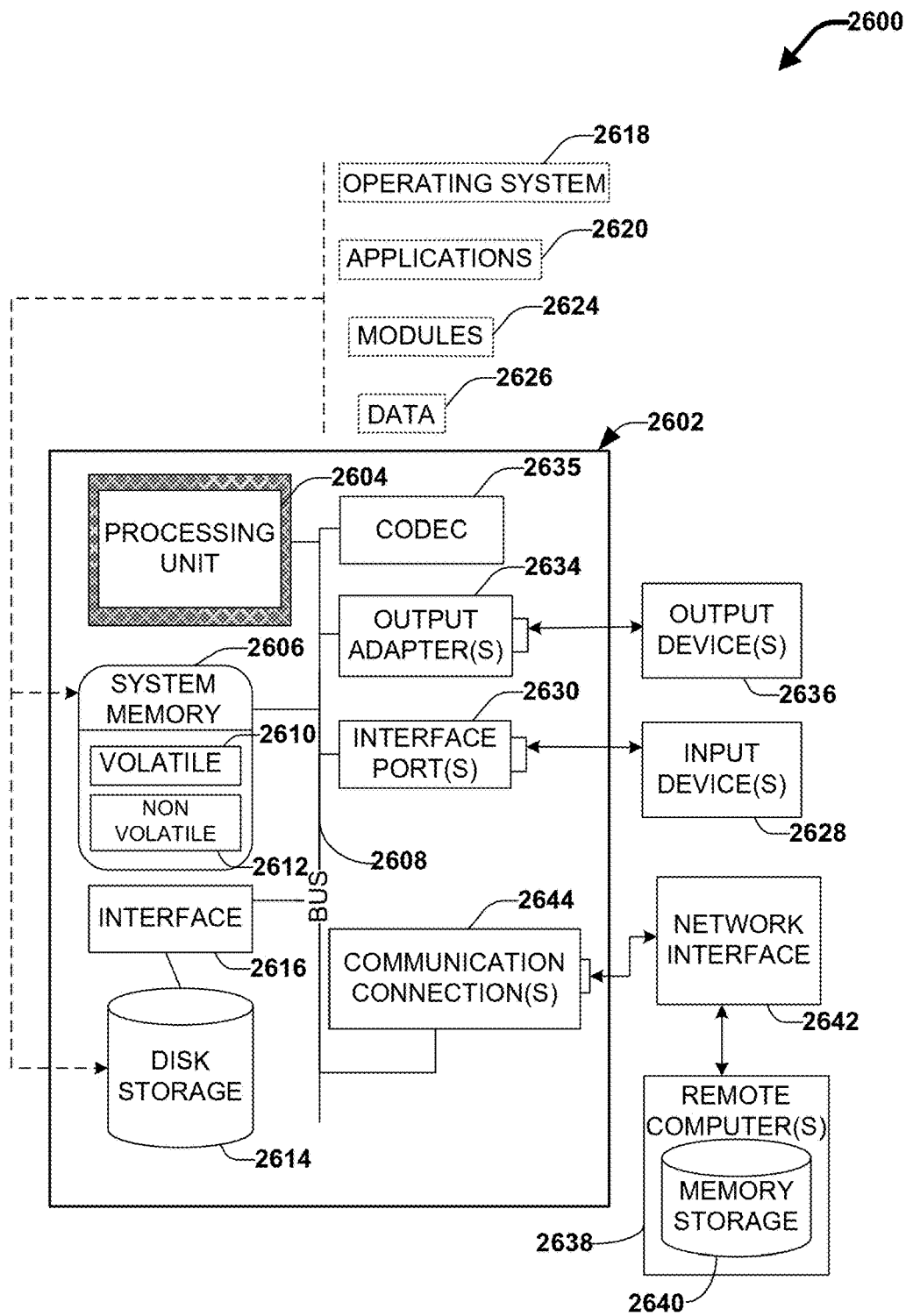
FIG. 26 illustrates a block diagram of an example, non-limiting operating environment in which one or more embodiments described herein can be facilitated.

With reference to FIG. 26, an example environment 2600 for implementing various aspects of the claimed subject matter includes a computer 2602. The computer 2602 includes a processing unit 2604, a system memory 2606, a codec 2635, and a system bus 2608. The system bus 2608 couples system components including, but not limited to, the system memory 2606 to the processing unit 2604. The processing unit 2604 can be any of various available processors. Dual microprocessors, one or more GPUs, CPUs, and other multiprocessor architectures also can be employed as the processing unit 2604.

The system bus 2608 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2606 includes volatile memory 2610 and non-volatile memory 2612, which can employ one or more of the disclosed memory architectures, in various embodiments. The basic input/output system (BIOS), containing the basic routines to transfer information between elements within the computer 2602, such as during start-up, is stored in non-volatile memory 2612. In addition, according to present innovations, codec 2635 can include at least one of an encoder or decoder, wherein the at least one of an encoder or decoder can consist of hardware, software, or a combination of hardware and software. Although, codec 2635 is depicted as a separate component, codec 2635 can be contained within non-volatile memory 2612. By way of illustration, and not limitation, non-volatile memory 2612 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 2612 can employ one or more of the disclosed memory devices, in at least some embodiments. Moreover, non-volatile memory 2612 can be computer memory (e.g., physically integrated with computer 2602 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 2610 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 2602 can also include removable/non-removable, volatile/non-volatile computer storage medium. FIG. 26 illustrates, for example, disk storage 2614. Disk storage 2614 includes, but is not limited to, devices like a magnetic disk drive, solid state disk (SSD), flash memory card, or memory stick. In addition, disk storage 2614 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2614 to the system bus 2608, a removable or non-removable interface is typically used, such as interface 2616. It is appreciated that disk storage 2614 can store information related to a user. Such information might be stored at or provided to a server or to an application running on a user device. In one embodiment, the user can be notified (e.g., by way of output device(s) 2636) of the types of information that are stored to disk storage 2614 or transmitted to the server or application. The user can be provided the opportunity to opt-in or opt-out of having such information collected or shared with the server or application (e.g., by way of input from input device(s) 2628).

It is to be appreciated that FIG. 26 describes software that acts as an intermediary between users and the basic computer resources described in the suitable operating environment 2600. Such software includes an operating system 2618. Operating system 2618, which can be stored on disk storage 2614, acts to control and allocate resources of the computer 2602. Applications 2620 take advantage of the management of resources by operating system 2618 through program modules 2624, and program data 2626, such as the boot/shutdown transaction table and the like, stored either in system memory 2606 or on disk storage 2614. It is to be appreciated that the claimed subject matter can be implemented with various operating systems or combinations of operating systems.

A user enters commands or information into the computer 2602 through input device(s) 2628. Input devices 2628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2604 through the system bus 2608 via interface port(s) 2630. Interface port(s) 2630 include, for example, a serial port, a parallel port, a game port, and a universal serial bus (USB). Output device(s) 2636 use some of the same type of ports as input device(s) 2628. Thus, for example, a USB port can be used to provide input to computer 2602, and to output information from computer 2602 to an output device 2636.

Output adapter 2634 is provided to illustrate that there are some output devices 2636 like monitors, speakers, and printers, among other output devices 2636, which require special adapters. The output adapters 2634 include, by way of illustration and not limitation, video and sound cards that provide a means of connection between the output device 2636 and the system bus 2608. It should be noted that other devices or systems of devices provide both input and output capabilities such as remote computer(s) 2638.

Computer 2602 can operate in a networked environment using logical connections to one or more remote computers, such as remote computer(s) 2638. The remote computer(s) 2638 can be a personal computer, a server, a router, a network PC, a workstation, a microprocessor based appliance, a peer device, a smart phone, a tablet, or other network node, and typically includes many of the elements described relative to computer 2602. For purposes of brevity, only a memory storage device 2640 is illustrated with remote computer(s) 2638. Remote computer(s) 2638 is logically connected to computer 2602 through a network interface 2642 and then connected via communication connection(s) 2644. Network interface 2642 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2644 refers to the hardware/software employed to connect the network interface 2642 to the bus 2608. While communication connection 2644 is shown for illustrative clarity inside computer 2602, it can also be external to computer 2602. The hardware/software necessary for connection to the network interface 2642 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a memory that stores computer executable components; and
 a processor that executes the computer executable components stored in the memory, wherein the computer executable components comprise:

a paired view generation component that generates alternate view images for respective medical images included in set of training images using one or more image augmentation techniques or one or more image selection techniques tailored based on domain knowledge associated with the respective medical images;

a training component trains a transformer network to learn reference feature representations for the respective medical images using their alternate view images and a self-supervised training process; and an indexing component that stores the reference feature representations in an indexed data structure with information identifying the respective medical images that correspond to the reference feature representations.

2. The system of claim 1, wherein the alternate view images comprise augmented versions of the respective medical images generated using the one or more image augmentation techniques, and wherein the one or more image augmentation techniques comprise altering an appearance of the respective medical images in a defined manner based on the domain knowledge in association with generating the alternate view images as synthetic versions of the respective medical images.

3. The system of claim 2, wherein the altering comprises changing one or more acquisition parameters of the respective medical images in association with generating the alternate view images.

4. The system of claim 2, wherein the altering comprises cropping the respective medical images based on regions of interest identified for the respective medical images in association with generating the alternate view images.

5. The system of claim 4, wherein the transformer network comprises a vision transformer network comprising attention heads, and wherein the computer executable components further comprise:
a region of interest component that identifies the regions of interest based on attention head maps derived from the attention heads in association with applying the vision transformer network to the respective medical images.

6. The system of claim 5, wherein the paired image component iteratively generates new alternate view images for the respective medical images based on the attention head maps, and wherein the training component iteratively retrains the transformer network to learn the reference feature representations for the respective medical images using their new alternate view images and the self-supervised training process.

7. The system of claim 1, wherein the alternate view images comprise similar versions of the respective medical images selected from an image dataset using the one or more image selection techniques, and wherein the one or more image selection techniques comprise selecting the similar versions based on defined similarity criteria for attributes of the respective medical images and their similar versions, wherein the attributes are included in metadata associated with the respective medical images and their similar versions.

8. The system of claim 7, wherein the attributes include acquisition parameter attributes, patient attributes, visual property attributes, and three-dimensional (3D) scan position attributes.

9. The system of claim 1, wherein the computer executable components further comprise:

a feature generator component that applies the transformer network to a new medical image to generate a feature representation for the new medical image; and a matching component that employs the feature representation and the reference feature representations to identify one or more similar medical images of the respective medical images whose reference feature representations have a defined degree of similarity to the feature representation.

10. The system of claim 9, wherein the computer executable components further comprise:
a retrieval component that retrieves the one or more similar medical images from a datastore where they are stored in response to identification of the one or more similar medical images.

11. The system of claim 9, wherein the indexing component further associates classification information with the reference feature representations in the indexed data structure, the classification information identifying one or more defined class attributes of the respective medical images corresponding to the reference feature representations, and wherein the computer executable components further comprise:
a classification component that determines a classification of the new medical image based on the one or more defined class attributes associated with the one or more similar medical images.

12. The system of claim 1, wherein the computer executable components further comprise:
a clustering component that clusters the feature representations into distinct clusters based on similarities between respective feature representations included in the distinct clusters; and
an annotation component that selects one or more representative medical images for each of the distinct clusters for annotation with classification information based on relative positions of their feature representations within or around the distinct clusters.

13. The system of claim 12, wherein based on selection, the annotation component receives the classification information for the one or more representative medical images resulting in annotated representative medical images, and wherein the training component further trains one or more classification models to classify non-annotated medical images based on their feature representations using the annotated representative medical images and their corresponding feature representations.

14. The system of claim 13, wherein the computer executable components further comprise:
a feature generator component that applies the transformer network to a new medical image to generate a feature representation for the new medical image; and
a classification component that applies the one or more classification models to the feature representation to determine a classification of the new medical image.

15. A method, comprising:
generating, by a system operatively coupled to a processor, alternate view images for respective medical images included in set of training images using one or more image augmentation techniques or one or more image selection techniques tailored based on domain knowledge associated with the respective medical images;

training, by the system, a transformer network to learn reference feature representations for the respective medical images using their alternate view images and a self-supervised training process; and storing, by the system, the reference feature representations in an indexed data structure with information identifying the respective medical images that correspond to the reference feature representations.

16. The method of claim 15, wherein generating comprises generating the alternate view images as augmented synthetic versions of the respective medical images using the one or more image augmentation techniques, and wherein the one or more image augmentation techniques comprise altering an appearance of the respective medical images in a defined manner based on the domain knowledge to generate the augmented synthetic versions.

17. The method of claim 15, wherein generating comprises generating the alternate view images as augmented synthetic versions of the respective medical images using the one or more image augmentation techniques, and wherein the one or more image augmentation techniques comprise cropping the respective medical images based on regions of interest identified for the respective medical images.

18. The method of claim 17, wherein the transformer network comprises a vision transformer network comprising attention heads, and wherein the method further comprises:
identifying, by the system, the regions of interest based on attention head maps derived from the attention heads in association with applying the vision transformer network to the respective medical images.

19. The method of claim 18, wherein the generating comprises iteratively generating new alternate view images for the respective medical images based on the attention head maps, and wherein the training comprises iteratively retraining the transformer network to learn the reference feature representations for the respective medical images using their new alternate view images and the self-supervised training process.

20. The method of claim 15, wherein the generating comprises selecting the alternate view images from image dataset using the one or more image selection techniques, and wherein the one or more image selection techniques comprise selecting the alternate view images based on defined similarity criteria for attributes of the respective medical images and their alternate view images, and wherein the attributes include acquisition parameter attributes, patient attributes, visual property attributes, and three-dimensional (3D) scan position attributes.

21. The method of claim 15, further comprising:
applying, by the system, the transformer network to a new medical image to generate a feature representation for the new medical image; and
employing, by the system, the feature representation and the reference feature representations to identify one or more similar medical images of the respective medical images whose reference feature representations have a defined degree of similarity to the feature representation.

22. The method of claim 21, further comprising:
associating, by the system, classification information with the reference feature representations in the indexed data structure, the classification information identifying one or more defined class attributes of the respective medical images corresponding to the reference feature representations; and
determining, by the system, a classification of the new medical image based on the one or more defined class attributes associated with the one or more similar medical images.

23. The method of claim 15, further comprising:
clustering, by the system, the feature representations into distinct clusters based on similarities between respective feature representations included in the distinct clusters; and
selecting, by the system, one or more representative medical images for each of the distinct clusters for annotation with classification information based on relative positions of their feature representations within or around the distinct clusters.

24. The method of claim 23, further comprising, in response to the selecting:
receiving, the classification information for the one or more representative medical images resulting in annotated representative medical images;
training, by the system, one or more classification models one or more classification models to classify non-annotated medical images based on their feature representations using the annotated representative medical images and their corresponding feature representations;
applying, by the system, the transformer network to a new medical image to generate a feature representation for the new medical image; and
applying, by the system, the one or more classification models to the feature representation to determine a classification of the new medical image.

25. A machine-readable storage medium, comprising executable instructions that, when executed by a processor, facilitate performance of operations, comprising:
generating alternate view images for respective medical images included in set of training images using one or more image augmentation techniques or one or more image selection techniques tailored based on domain knowledge associated with the respective medical images;
training a transformer network to learn reference feature representations for the respective medical images using their alternate view images and a self-supervised training process; and
storing the reference feature representations in an indexed data structure with information identifying the respective medical images that correspond to the reference feature representations.

* * * * *